(12) United States Patent
Sabatier

(10) Patent No.: US 12,209,465 B2
(45) Date of Patent: *Jan. 28, 2025

(54) PIPE CONNECTOR

(71) Applicant: 925599 Alberta Ltd., Bonnyville (CA)

(72) Inventor: Clint Roger Sabatier, Bonnyville (CA)

(73) Assignee: 925599 Alberta Ltd., Bonnyville (CA)

( * ) Notice: Subject to any disclaimer, the term of this patent is extended or adjusted under 35 U.S.C. 154(b) by 83 days.

This patent is subject to a terminal disclaimer.

(21) Appl. No.: 17/723,709

(22) Filed: Apr. 19, 2022

(65) Prior Publication Data
US 2022/0235637 A1    Jul. 28, 2022

Related U.S. Application Data

(60) Division of application No. 15/096,129, filed on Apr. 11, 2016, now Pat. No. 11,339,634, which is a
(Continued)

(51) Int. Cl.
*E21B 17/08* (2006.01)
*E21B 17/042* (2006.01)
(Continued)

(52) U.S. Cl.
CPC ............ *E21B 17/08* (2013.01); *E21B 17/042* (2013.01); *E21B 17/1007* (2013.01);
(Continued)

(58) Field of Classification Search
CPC ....... F16L 15/001; F16L 15/002; F16L 15/08; F16L 58/182; E21B 17/042;
(Continued)

(56) References Cited

U.S. PATENT DOCUMENTS 906,225 A     12/1908  Harry
1,889,870 A   12/1932  Montgomery
(Continued)

FOREIGN PATENT DOCUMENTS

CN    1420972 A      5/2003
CN    201599518 U   10/2010
(Continued)

OTHER PUBLICATIONS

Canadian Patent Application No. 2,982,000, Office Action dated Sep. 2, 2022.
(Continued)

*Primary Examiner* — Zachary T Dragicevich
(74) *Attorney, Agent, or Firm* — Dority & Manning, P.A.

(57) ABSTRACT

A pipe connector that includes a body with opposed connection portions for connecting two pipes is provided. A protective portion extends along at least a portion of an inside surface intermediate the connection portions. The protective portion includes a protective material that is less abrasive to a rod string than the body. An inside diameter of the connector along at least a portion of the protective portion is equal to or narrower than an inside diameter at other portions of the connector for preferentially contacting the rod string with the protective material over other portions of the body. The connector may include an extended gripping portion for gripping with power tongs, and may further include a reinforced portion for increasing resistance of the pipe connector to deformation when threadedly connected with a tubing joint with the connector.

40 Claims, 22 Drawing Sheets

Related U.S. Application Data continuation-in-part of application No. 15/014,941, filed on Feb. 3, 2016, now Pat. No. 11,092,266.

(60) Provisional application No. 62/146,073, filed on Apr. 10, 2015.

(51) Int. Cl.
*E21B 17/10* (2006.01)
*E21B 19/16* (2006.01)
*F16L 15/08* (2006.01)

(52) U.S. Cl.
CPC .......... *E21B 17/1042* (2013.01); *E21B 19/16* (2013.01); *F16L 15/08* (2013.01)

(58) Field of Classification Search
CPC ............. E21B 17/1042; E21B 17/1007; E21B 43/127; E21B 19/16
USPC .................................. 285/55, 333, 334, 390
See application file for complete search history.

(56) References Cited

U.S. PATENT DOCUMENTS

| | | | |
|---|---|---|---|
| 2,117,357 | A | 5/1938 | Peterson |
| 3,067,593 | A | 12/1962 | McCool |
| 3,266,821 | A | 8/1966 | Safford |
| 3,482,007 | A | 12/1969 | Benjamin |
| 3,572,777 | A | 3/1971 | Thomas et al. |
| 3,620,555 | A | 11/1971 | Hinds et al. |
| 4,431,219 | A | 2/1984 | Brewer et al. |
| 4,509,776 | A | 4/1985 | Yoshida et al. |
| 4,679,831 | A | 7/1987 | Kielminski |
| 4,706,997 | A | 11/1987 | Carstensen |
| 4,771,811 | A | 9/1988 | DeCell et al. |
| 4,955,645 | A | 9/1990 | Weems |
| 5,133,576 | A | 7/1992 | Barnhill |
| 5,236,230 | A | 8/1993 | Mudge, Jr. et al. |
| 5,406,983 | A | 4/1995 | Chambers et al. |
| 5,689,871 | A | 11/1997 | Carstensen |
| 5,779,276 | A | 7/1998 | Allen |
| 6,073,332 | A | 6/2000 | Turner |
| 6,176,524 | B1 | 1/2001 | Tsuru et al. |
| 6,312,024 | B1 | 11/2001 | Dutilleul et al. |
| 6,464,013 | B2 | 10/2002 | Bystedt |
| 6,609,735 | B1 | 8/2003 | Delange et al. |
| 6,811,187 | B2 | 11/2004 | Otten et al. |
| 6,827,996 | B2 | 12/2004 | Goto |
| D524,427 | S | 7/2006 | Wilk, Jr. et al. |
| D565,707 | S | 4/2008 | Brockington et al. |
| 7,690,696 | B2 | 4/2010 | Mallis et al. |
| 7,731,246 | B2 | 6/2010 | Mclaughlin |
| 7,866,706 | B2 | 1/2011 | Goto et al. |
| 8,052,173 | B2 | 11/2011 | Carcagno et al. |
| 8,167,340 | B2 | 5/2012 | Olivier, III |
| 8,496,273 | B1 | 7/2013 | Carstensen |
| 8,590,627 | B2 | 11/2013 | Jin et al. |
| 8,678,121 | B2 | 3/2014 | Troy et al. |
| 9,004,544 | B2 | 4/2015 | Carcagno et al. |
| 2004/0174017 | A1 | 9/2004 | Brill et al. |
| 2005/0173919 | A1 | 8/2005 | Posson |
| 2010/0001520 | A1 | 1/2010 | Hanna et al. |
| 2012/0119484 | A1 | 5/2012 | McLaughlin et al. |
| 2013/0320665 | A1 | 12/2013 | Gard et al. |
| 2014/0238661 | A1 | 8/2014 | Gard et al. |
| 2015/0027581 | A1 | 1/2015 | Bouey et al. |
| 2015/0041152 | A1 | 2/2015 | Klotz et al. |

FOREIGN PATENT DOCUMENTS

| | | |
|---|---|---|
| CN | 201818930 U | 5/2011 |
| CN | 102146772 A | 8/2011 |
| CO | 12055217 | 7/2012 |
| CO | 12087102 A2 | 10/2012 |
| JP | H01115417 A | 5/1989 |
| WO | 9837350 A1 | 8/1998 |
| WO | WO 2011/039623 A2 | 4/2011 |
| WO | WO 2011/053590 A1 | 5/2011 |

OTHER PUBLICATIONS

Canadian Patent Application No. 2,920,030, Office Action dated May 26, 2022.
Casing Table, "Tarpon Pipe & Supply," www.tarponpipe.com, p. 29.
Casing and Tubing, http://petrowiki.org/Casing_and_tubing, [retrieved on May 2, 2016] pp. 1-8.
Coupling Make-Up, Ancillary Specifications, Hunting TKC EUE, Aug. 2014, pp. 1-7.
Field Running and Handling Procedures, Recommended Practice TKC, TKC Plus, Hunting TKC EUE, Aug. 2012, pp. 1-11.
Full Length Drift/End Drift Inspection Procedure, Ancillary Specification (Generic), Hunting TKC EUE, Sep. 2005, pp. 1-4.
Hirschfeldt., API Tubing Table, www.oilproduction.net, p. 1.
Mexican Patent Application No. MX20170012976, Office Action dated Aug. 23, 2022—English Translation Not Available.
Parker Tubing and Connector Technical Guide, Connector and Tubing Solutions Technical Guide, pp. 1-172.
Running Manual Tenaris Hydril, pp. 1-151.
Seal-Lock HT, Specialty Casing and Tubing Connection, brochure 2011, Hunting, pp. 1-8.
Steel Imperfections, TKC, TKC Plus 8 Round Ancillary Specifications, Hunting TKC EUE, Mar. 1997, pp. 1-2.
U.S. Appl. No. 15/014,941, Non-Final Office Action dated Sep. 26, 2019.
VAM Top, "The Industry Reference for Premium Connections," Vallourec Oil and Gas France, Brochure 2014, pp. 1-8.
Visual Thread Inspection, TKC, TKC Plus 8 Round Ancillary Specifications, Hunting TKC EUE, May 2008, pp. 1-2.
"API Specification 5B—Specification for Threading, Gauging and Thread Inspection of Casing, Tubing, and Line Pipe Threads", American Petroleum Institute, Fifteenth Edition, Apr. 2008 (Cover Page only).
Threading, Gauging, and Inspection of Casing, Tubing, and Line Pipe Threads, API Specification 5B, Sixteenth Edition Dec. 2017, American Petroleum Institute, Table of Contents, Chapter 1, and Chapter 4, 35 pages.
Australian Patent Application No. 2016244745, Office Action dated Apr. 27, 2020.
Chinese Patent Application No. 201680033627.4, Office Action dated Dec. 12, 2018—English Translation available.
Chinese Patent Application No. 201680033627.4, Office Action dated Aug. 5, 2019—English Translation Available.
Colombian Patent Application No. NC2017100114 79, Office Action dated Nov. 12, 2017—with unofficial English Translation.
Colombian Patent Application No. NC2017/0011479, Office Action dated May 3, 2019.
Indian Patent Application No. 201717039315, Office Action dated Aug. 6, 2020.
Mexican Patent Application No. MX20170012976, Office Action dated Sep. 23, 2020—English Translation Available. [Translation is Unofficial].
United Arab Emirates Patent Application No. 6001293, Office Action dated Jul. 29, 2021.

PIPE CONNECTOR

CROSS REFERENCE TO RELATED APPLICATIONS

This application is a divisional application of U.S. patent application Ser. No. 15/096,129, filed Apr. 11, 2016, now U.S. Pat. No. 11,339,634, which claims the benefit of priority of U.S. Provisional patent Application No. 62/146,073, filed Apr. 10, 2015, and which is also a continuation-in-part of U.S. patent application Ser. No. 15/014,941, filed Feb. 3, 2016, now U.S. Pat. No. 11,092,266, which are each hereby incorporated by reference.

FIELD

The present disclosure relates generally to assembly of sections of pipe for production of fluids from wells.

BACKGROUND

Underground reservoirs of fluids (e.g. hydrocarbons, water, etc.) are often recovered by drilling a well into the reservoir and pumping fluids out of the reservoir through tubing. A tubing string used to recover fluids from a reservoir may be assembled from individual joints of tubing. The joints are often threaded with pin ends on both ends and connected by connectors with threaded box ends on both ends. Produced fluids may be conveyed uphole through the tubing string using an artificial lift method that includes use of a rod string, such a progressive cavity pump. In some cases, the rod string wears more severely at connectors between joints of production tubing than elsewhere in the production string. Rod wear may result in the rod string breaking. To continue production after a rod string is broken, an uphole portion of the rod string must be pulled and a downhole portion of the rod string must be fished from the production string. Pulling the production string and fishing the broken rod result in lost time and additional cost.

SUMMARY

Herein disclosed is a pipe connector for use in a production string that includes a rod string for artificial lift, and methods for using and manufacturing the pipe connector. When using a rotating rod production method, such as a progressive cavity pump, the rod string may be urged against an inside surface of the production string, for example in a deviated portion of a well. Where the rod string is urged against the box connector at an interface between pin ends (typically on joints of production tubing) and box ends (typically on connectors), rotation of the rod string against the connector may result in rod wear. The rod wear may result in breaking the rod string. To continue production after the rod string is broken, an uphole portion of the rod string may be pulled and a downhole portion of the rod string fished from the production string. These and other corrective measures complicate and increase the cost of production from the well. It is therefore desirable to mitigate rod wear at the connectors.

The pipe connector disclosed herein includes a protective portion on an inside surface of the pipe connector between box ends or other connection portions of the pipe connector. The protective portion includes a protective material, which relative to the grades of steel or other materials typically used to manufacture production tubing connectors, is softer and has a lower coefficient of friction with the rod string. As a result, the protective portion is less abrasive to the rod string than a steel surface found on other portions of the connector would be. An inside diameter of the connector along the protective portion is equal to or narrower than elsewhere between the box ends. As a result, the rod string will contact the protective portion preferentially to other portions of the connector. Since the rod string contacts the protective portion preferentially, and the protective portion is less abrasive than the steel body of previous tubing connectors, the pipe connector disclosed herein may mitigate rod wear compared with previous pipe connectors.

The pipe connector disclosed herein may include a gripping portion to facilitate use of the connector with power tongs. The gripping portion may extend between the connection portions of the connector. The gripping portion facilitates gripping the pipe connector with power tongs to make up or break a connection between pipes. A gripping surface extends along the outside surface of the gripping portion along a portion of the pipe connector that is free of threading on the inside diameter of the pipe connector. The gripping surface on the outside surface may be coextensive with the protective portion on the inside surface. The gripping portion is at least as long as a die that is likely to be used on the power tongs when making or breaking connections between the connector and sections of pipe. The power tongs tong on to the pipe connector on the gripping surface, and gripping force on the pipe connector required for applying makeup torque is localized to the gripping portion, avoiding direct application of force to portions of the body with threading on the inside surface and lowering the likelihood of thread damage at a given torque value compared with tonging onto the outside surface of a box end connection portion.

The pipe connector disclosed herein may include the gripping portion with a wall thickness along at least a portion of the length of the gripping portion sufficient to provide a reinforced portion of the pipe connector. The reinforced portion may provide resistance to deformation of the pipe connector. An increase in the torque required to thread the connector, allowing connections to be made up at greater torque values for the same number of turns, was observed in an example application of the pipe connector including the protective portion, the gripping surface, and the reinforced portion. This increase in a torque-to-turn ratio may be due to the resistance to deformation provided by the reinforced portion. The reinforced portion may include a torque stop for facilitating torqueing the connections to full makeup. The reinforced portion facilitates making up a connection between tubing joints or other sections of pipe at a greater torque value without requiring that the connection portions have any particular thread pattern. The connection portions may include interference fit threading that matches commonly-used American Petroleum Institute ("API") standard interference fit threading (e.g. 8 round threading used on production tubing, etc.), allowing connections between sections of pipe with the threading pattern to be made up using the pipe connector at greater torque values than would be the case with previous API pipe connectors. Using a pipe connector including the protective portion, the gripping surface, the reinforced portion, and API interference fit threading, may facilitate making up connections at torque values above the optimum API specification value, and in some cases at or in excess of the API maximum specification for the pipe outside diameter and steel grade being used, with a reduced chance of thread damage. The gripping surface provides an effective location to grip with power tongs. The length of the gripping surface also facilitates including the reinforced portion between the connection portions by spreading the additional mass along the length, providing the reinforced portion while mitigating encroachment of the connector body walls into a flow path through the body of the pipe connector. The length of the gripping surface increases the contribution to increased mass of a given wall thickness of the body along the reinforced portion. The length of the gripping surface also provides additional inside surface length for the protective portion, which may contribute to mitigation of rod wear damage.

In a first aspect, the present disclosure provides a pipe connector. The connector includes a body with opposed connection portions for connecting two pipes. A protective portion extends along at least a portion of an inside surface intermediate the connection portions. The protective portion includes a protective material that is less abrasive to a rod string than the body. An inside diameter of the connector along at least a portion of the protective portion is equal to or narrower than an inside diameter at other portions of the connector for preferentially contacting the rod string with the protective material over other portions of the body. The connector may include an extended gripping portion for gripping with power tongs, and may further include a reinforced portion for increasing resistance of the pipe connector to deformation when threadedly connected with a tubing joint with the connector.

In a further aspect, the present disclosure provides a connector including: a body extending between a first end and a second end; a first connection portion proximate the first end for connecting with a first pipe; a second connection portion proximate the second end for connecting with a second pipe; and a protective portion extending along at least a portion of an inside surface of the body intermediate the first connection portion and the second connection portion, the protective portion comprising a protective material that is less abrasive than the body to a rod string. A protective portion inside diameter of the body and the protective material along at least a portion of the protective portion is equal to or narrower than an inside diameter at other portions of the body.

In some embodiments, the protective portion comprises a sleeve of the protective material secured within the body. In some embodiments, the connector includes a groove defined in the inside surface along the protective portion and wherein the sleeve is secured within the body by seating within the groove; in some embodiments, the sleeve comprises a split sleeve. In some embodiment, the sleeve is secured against a stop intermediate the protective portion and the first connection portion; in some embodiments, the sleeve is secured against the stop by a press ring intermediate the protective portion and the second connection portion. In some embodiments, the protective material comprises polyethylene with a hardness of about 65 Shore D and a dynamic coefficient of friction of about 0.10. In some embodiments, the protective material comprises nylon with a hardness of between about 75 and about 85 Shore D, and a dynamic coefficient of friction of about 0.20.

In some embodiments, the protective portion comprises a layer of protective material bonded to the inside surface. In some embodiments, the protective material comprises a thermally set resin; in some embodiments, the thermally set resin comprises a zirconium fusion-bonded epoxy powder coating with a pencil hardness (H scale) rating of 6H. In some embodiments, the protective material comprises an extrusion-set coating. In some embodiments, the protective material comprises a metallic alloy coating; in some embodiments, the metallic alloy coating comprises a coating with a hardness of between about 45 and about 55 Rockwell C, a wear resistance of between about 12 and about 16 on the Taber wear index, and a dynamic coefficient of friction of about 0.15.

In some embodiments, the first connection portion comprises a first box end with threading on the inside surface for connecting with the first pipe and the second connection portion comprises a second box end with the threading on the inside surface for connecting with a second pipe. In some embodiments, the connector includes a gripping surface extending along an outside surface of the body intermediate the first connection portion and the second connection portion for a gripping length at least as long as a die length of a pair of power tongs used to connect the connector with production tubing.

In some embodiments, the gripping surface comprises a recessed gripping surface; the body has a first outside diameter along the first and second connection portions and a second outside diameter along the recessed gripping surface; and the first outside diameter is larger than the second outside diameter. In some embodiments, a first outside diameter transition point between the first outside diameter and the second outside diameter is located intermediate the first end and the recessed gripping surface; and a second outside diameter transition point between the first outside diameter and the second outside diameter is located intermediate the second end and the recessed gripping surface. In some embodiments, the first outside diameter transition point is located on a portion of the outside surface coextensive with the first connection portion on the inside surface; the second outside diameter transition point is located on a portion of the outside surface coextensive with the second connection portion on the inside surface; and a portion of body with the second outside diameter extends axially outward from the tong gripping portion into each of the first and second connection portions; in some embodiments, the first outside diameter transition point is located on a portion of the outside surface axially inward along the body from the first connection portion; the second outside diameter transition point is located on a portion of the outside surface axially inward along the body from the second connection portion; and a portion of body with the first outside diameter extends axially inwards along the body from each of the first and second connection portions.

In some embodiments, the first connection portion comprises a first box end with threading on the inside surface for connecting with the first pipe and the second connection portion comprises a second box end with the threading on the inside surface for connecting with a second pipe. In some embodiments, the connector includes a gripping surface extending along an outside surface of the body intermediate the first connection portion and the second connection portion for a gripping length at least as long as a die length of a pair of power tongs used to connect the connector with production tubing.

In some embodiments, the threading comprises interference fit threading and the connector further comprising a reinforced portion of the body intermediate the first connection portion and the second connection portion for resisting deformation of the body when a connection is made up with the connector. In some embodiments, the reinforced portion comprises: a first torque stop defined on the inside surface proximate the first connection portion for abutting the first pipe when the first pipe is connected with the first connection portion; and a second torque stop defined on the inside surface proximate the second connection portion for abutting the second pipe when the second pipe is connected with the second connection portion.

In some embodiments, the reinforced portion further comprises a reinforcing member extending between the first torque stop and the second torque stop. In some embodiments, the protective portion extends along the inside surface substantially along the entire length of the reinforcing member; in some embodiments, the inside diameter of the body is substantially constant along the reinforcing member between the first torque stop and the second torque stop; in some embodiments, the reinforcing member extends along the body substantially along the entire length of the gripping portion. In some embodiments, the reinforcing member extends along the body substantially along the entire length of the gripping portion.

In some embodiments, the first connection portion comprises a first box end with threading on the inside surface for connecting with the first pipe and the second connection portion comprises a second box end with the threading on the inside surface for connecting with a second pipe. In some embodiments, the connector includes a gripping surface extending along an outside surface of the body intermediate the first connection portion and the second connection portion for a gripping length at least as long as a die length of a pair of power tongs used to connect the connector with production tubing. In some embodiments, the gripping length is about 3.5 inches and the connector has an outside diameter of 4.5 inches along the first and second connection portions; in some embodiments, the gripping length is about two inches longer than the die length; the gripping length is about twice as long as the die length.

In some embodiments, the first connection portion comprises a first box end with threading on the inside surface for connecting with the first pipe and the second connection portion comprises a second box end with the threading on the inside surface for connecting with a second pipe. In some embodiments, the connector includes a gripping surface extending along an outside surface of the body intermediate the first connection portion and the second connection portion for a gripping length at least as long as a die length of a pair of power tongs used to connect the connector with production tubing. In some embodiments, the gripping length is about 3.25 inches; the connector has an outside diameter of about 4.5 inches along the first and second connection portions; and the first pipe and the second pipe each comprise a 3.5 inches outside diameter API interference fit threaded production tubing joint. In some embodiments, the body is manufactured from J-55 grade steel. In some embodiments, the reinforced portion comprises a portion of the body with wall thickness of about 0.625 inches. In some embodiments, the protective portion inside diameter is narrower than the inside diameter at other portions of the body by at least 0.025 inches. In some embodiments, the protective portion inside diameter is about 2.5 inches; in some embodiments, the protective portion extends along the inside surface by a length of about 2.0 inches.

In some embodiments, the first pipe and the second pipe each comprise a production tubing joint.

In some embodiments, the first pipe and the second pipe each have an outside diameter of 3.5 inches.

In some embodiments, the pipes have an outside diameter of 2.375, 2.875, 3.5, 4.5, 5.5, or 7.0 inches.

In some embodiments, the protective portion inside diameter is equal to or narrower than an inside diameter of production tubing with which the connector is designed to be used.

In some embodiments, the protective portion inside diameter is substantially equal to an inside diameter of production tubing with which the connector is used.

In a further aspect, the present disclosure provides a method of manufacturing a connector comprising: providing a connector including a body having an inside surface portion intermediate opposed connection portions; and securing a protective material to the inside surface portion to provide a protective portion along at least a portion of the inside surface portion. The protective material is less abrasive than the body to a rod string. A protective portion inside diameter of the body and the protective material along at least a portion of the protective portion is equal to or narrower than an inside diameter at other portions of the body.

In some embodiments, securing protective material to the inside surface portion comprises applying a protective coating to the inside surface portion.

In some embodiments, securing protective material to the inside surface portion comprises securing a sleeve within a groove defined in the inside surface portion.

In some embodiments, securing protective material to the inside surface portion comprises securing a sleeve against a stop.

In some embodiments, the protective portion inside diameter is equal to or narrower than an inside diameter of production tubing with which the connector is used.

In a further aspect, the present disclosure provides a connector for connecting a first pipe with a second pipe using power tongs having a die length, the connector comprising: a body extending between a first end and a second end; a first connection portion proximate the first end including threading on an inside surface of the connector for connecting with a first pipe; a second connection portion proximate the second end including the threading on the inside surface for connecting with a second pipe; a protective portion extending along at least a portion of the inside surface intermediate the first connection portion and the second connection portion, the protective portion comprising a protective material that is less abrasive than the body to a rod string; and a gripping surface extending along an outside surface of the body intermediate the first connection portion and the second connection portion, the gripping surface extending along the outside surface for a gripping length at least as long as the die length. A protective portion inside diameter of the body and the protective material along at least a portion of the protective portion is equal to or narrower than an inside diameter at other portions of the connector.

In some embodiments, the protective portion comprises a sleeve of the protective material secured within the body. In some embodiments, the connector includes a groove defined in the inside surface along the protective portion and wherein the sleeve is secured within the body by seating within the groove; in some embodiments, the sleeve comprises a split sleeve. In some embodiment, the sleeve is secured against a stop intermediate the protective portion and the first connection portion; in some embodiments, the sleeve is secured against the stop by a press ring intermediate the protective portion and the second connection portion. In some embodiments, the protective material comprises polyethylene with a hardness of about 65 Shore D and a dynamic coefficient of friction of about 0.10. In some embodiments, the protective material comprises nylon with a hardness of between about 75 and about 85 Shore D, and a dynamic coefficient of friction of about 0.20.

In some embodiments, the protective portion comprises a layer of protective material bonded to the inside surface. In some embodiments, the protective material comprises a thermally set resin; in some embodiments, the thermally set resin comprises a zirconium fusion-bonded epoxy powder coating with a pencil hardness (H scale) rating of 6H. In some embodiments, the protective material comprises an extrusion-set coating. In some embodiments, the protective material comprises a metallic alloy coating; in some embodiments, the metallic alloy coating comprises a coating with a hardness of between about 45 and about 55 Rockwell C, a wear resistance of between about 12 and about 16 on the Taber wear index, and a dynamic coefficient of friction of about 0.15.

In some embodiments, the gripping surface comprises a recessed gripping surface; the body has a first outside diameter along the first and second connection portions and a second outside diameter along the recessed gripping surface; and the first outside diameter is larger than the second outside diameter.

In some embodiments, the connector includes a reinforced portion of the body intermediate the first connection portion and the second connection portion for resisting deformation of the body when a connection is made up with the connector. In some embodiments, the reinforced portion comprises: a first torque stop defined on the inside surface proximate the first connection portion for abutting the first pipe when the first pipe is connected with the first connection portion; and a second torque stop defined on the inside surface proximate the second connection portion for abutting the second pipe when the second pipe is connected with the second connection portion.

In some embodiments, the connector includes a reinforced portion of the body intermediate the first connection portion and the second connection portion for resisting deformation of the body when a connection is made up with the connector. In some embodiments, the gripping length is about 3.25 inches; the connector has an outside diameter of about 4.5 inches along the first and second connection portions; and the first pipe and the second pipe each comprise a 3.5 inches outside diameter API interference fit threaded production tubing joint. In some embodiments, the body is manufactured from J-55 grade steel. In some embodiments, the reinforced portion comprises a portion of the body with wall thickness of about 0.625 inches. In some embodiments, the inside diameter of the body and the protective material is narrower than the inside diameter at other portions of the body by about 0.025 inches. In some embodiments, the protective portion extends along the inside surface by a length of about 2.0 inches.

In some embodiments, the first pipe and the second pipe comprise production tubing and the API interference fit threading comprises 8 round threading.

In some embodiments, the first pipe and the second pipe comprise production tubing and the API interference fit threading comprises 10 round threading.

In a further aspect, the present disclosure provides a method of connecting a first pipe with a second pipe comprising: providing a connector. The connector includes: a protective portion extending along at least a portion of an inside surface of a body of the connector intermediate a pair of interference fit threaded connection portions, the protective portion comprising a protective material that is less abrasive than the body to a rod string; a gripping surface on an outside surface of the body intermediate the pair of connection portions; and a reinforced portion of the body intermediate the pair of connection portions for resisting deformation of the connector when a connection is made up with the connector. A protective portion inside diameter of the body and the protective material along at least a portion of the protective portion is equal to or narrower than an inside diameter at other portions of the connector. The method further includes tonging on to the gripping surface and on to the first pipe with a power tong; rotating the connector relative to the first pipe to connect the connector to the first pipe at a torque value with the power tong; tonging on to the gripping surface and on to the second pipe with the power tong; and rotating the second pipe relative to the connector to connect the connector to the second pipe at the torque value with the power tong.

In some embodiments, the connector further comprises a pair of torque stops proximate the connection portions, each of the torque stops for abutting a nose of a pipe threaded into the connection portion proximate the torque stop. In some embodiments, abutting the nose is indicative of the torque value having been reached.

In some embodiments, the connection portions are threaded with API interference fit threading. In some embodiments, the torque value is in excess of the API optimum value at the same grade of steel for a connector used with pipe having an outside diameter equal to a reference outside diameter value of the first pipe and the second pipe. In some embodiments, the torque value is in excess of the API maximum value at the same grade of steel for a connector used with pipe having an outside diameter equal to the reference outside diameter value.

In some embodiments, the connection portions are threaded with API interference fit threading. In some embodiments, the gripping length is about 3.25 inches; the connector has an outside diameter of about 4.5 inches along the first and second connection portions; and the first pipe and the second pipe each comprise a 3.5 inches outside diameter API interference fit threaded production tubing joint. In some embodiments, the body is manufactured from J-55 grade steel. In some embodiments, the reinforced portion comprises a portion of the body with wall thickness of about 0.625 inches. In some embodiments, the torque value is in excess of the API maximum value for a connector used with pipe having an outside diameter equal to the reference outside diameter value. In some embodiments, the torque value is at least 3,000 ft·lbs. In some embodiments, the torque value is about 3,600 ft·lbs; in some embodiments, the protective portion inside diameter is narrower than the inside diameter at other portions of the body by at least 0.025 inches.

In some embodiments, the first pipe and the second pipe each comprise a production tubing joint.

In some embodiments, the protective portion comprises a sleeve of the protective material secured within the body.

In some embodiments, the protective portion comprises a sleeve of the protective material secured within the body. In some embodiments, the connector includes a groove defined in the inside surface along the protective portion and wherein the sleeve is secured within the body by seating within the groove; in some embodiments, the sleeve comprises a split sleeve. In some embodiment, the sleeve is secured against a stop intermediate the protective portion and the first connection portion; in some embodiments, the sleeve is secured against the stop by a press ring intermediate the protective portion and the second connection portion. In some embodiments, the protective material comprises polyethylene with a hardness of about 65 Shore D and a dynamic coefficient of friction of about 0.10. In some embodiments, the protective material comprises nylon with a hardness of between about 75 and about 85 Shore D, and a dynamic coefficient of friction of about 0.20.

In some embodiments, the protective portion comprises a layer of protective material bonded to the inside surface. In some embodiments, the protective material comprises a thermally set resin; in some embodiments, the thermally set resin comprises a zirconium fusion-bonded epoxy powder coating with a pencil hardness (H scale) rating of 6H. In some embodiments, the protective material comprises an extrusion-set coating. In some embodiments, the protective material comprises a metallic alloy coating; in some embodiments, the metallic alloy coating comprises a coating with a hardness of between about 45 and about 55 Rockwell C, a wear resistance of between about 12 and about 16 on the Taber wear index, and a dynamic coefficient of friction of about 0.15.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached figures, in which features sharing reference numerals with a common final two digits of a reference numeral correspond to similar features across multiple figures (e.g. the body 12, 112, 212, 312, 412, 512, 612, 712, 812, 912, 1012, 1112, 1212, etc.).

DETAILED DESCRIPTION

Figure 1:
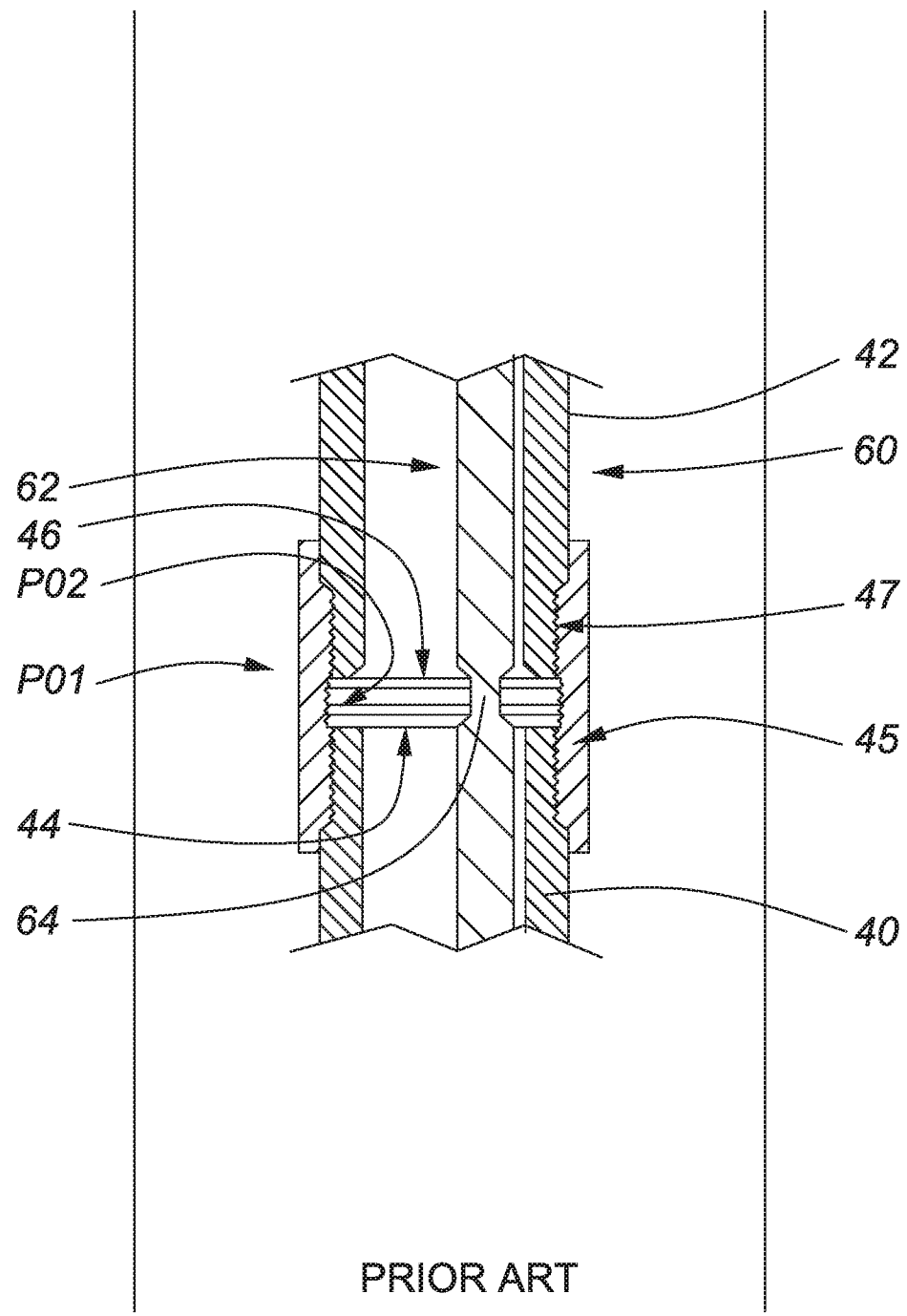
FIG. 1 is a cross-sectional view of production string with production tubing joints connected with previous connectors.

Generally, the present disclosure provides connectors, for example tubing connectors, for connecting sections of pipe, for example joints of production tubing. The connectors disclosed herein include a protective portion extending along a portion of an inside surface of the connector between two threaded connection portions. The protective portion includes a protective material that is less abrasive to a rod string being rotated while urged against the protective portion than would be the case if the rod string were urged against the grades of steel or other materials ordinarily used to manufacture connectors. The connector has an inside diameter along the protective portion selected to contact the rod string when urged against the production string preferentially to other portions of the connector. As a result, the connectors disclosed herein may mitigate rod wear in a production string relative to a production string assembled using previous connectors lacking the protective portion.

In addition to the protective portion, the connectors may include an extended tong gripping portion on an outside surface of the connector intermediate the connection portions at either end of the body. The outside surface of the body along the tong gripping portion provides a tong gripping surface to facilitate gripping the connectors with power tongs. The protective portion extends along the inside surface of the body and the gripping portion extends along the outside surface of the body. The protective portion and the gripping portion may be at least partially co-extensive along the length of the body. The length of the tong gripping portion for a given connector may be selected with reference to the outside diameter of the pipes with which the given connector will be used and the length of power tong dies that would be used on power tongs gripping the connector. The length of the tong gripping portion may be at least as long as the expected die length. The expected die length may be a maximum die length for power tongs being used with the connector and with pipe of the outside diameter for which the well tubing connector is designed to be used.

In addition to the protective portion, the connectors may include both the extended tong gripping portion and a reinforced portion of the body, each intermediate the two threaded connection portions. The protective portion extends along the inside surface of the body, the gripping portion extends along the outside surface of the body, and the reinforced portion is defined by a wall thickness and length of the body. A combination of two or more of the protective portion, the gripping portion, and the reinforced portion may be at least partially co-extensive along the length of the body. The reinforced portion, which may include a torque stop or other radial extension into a flow passage defined within the connector, increases the strength and resistance to deformation of the body proximate the threaded connection portions and in some cases at the threaded connections. The torque required per turn to thread a pin end into one of the two threaded connection portions is increased relative to previous connectors having the same thread. The increase in torque per turn facilitates connection of pipes having commonly-used thread patterns at greater torque than with previous connectors. The length of the tong gripping portion facilitates providing the reinforced portion without increasing a wall thickness of the connector body to the point where the flow passage lacks a sufficient cross-section area for a selected fluid flow rate. The protective portion and the reinforced portion may be dimensioned such that the flow passage along the protective portion is equal to or narrower than elsewhere in the connector or the pipe to be connected with the connector without overly restricting fluid flow through the connector. The reinforced portion may include a torque stop for facilitating torqueing the connections to full makeup. When the connections are completely made up, a recognizable increase in torque with no further turning results, mitigating unintentional or overthreading of the connector beyond full makeup.

Previous Connectors

FIG. 1 shows a cross section of a production string 60 including a first tubing joint 40 and a second tubing joint 42 connected using a previous tubing joint connector P01. A rod string 62 is included within the production string 60 to provide artificial lift for producing fluids through the production string 60. The rod string 62 includes a damaged portion 64 where rod wear, sometimes referred to as "knuckling", has compromised the rod string 62. The damaged portion 64 corresponds to the location of the connector P01, where rod wear is more likely to occur than in the production tubing itself. In some cases, the rod string 62 will break at the damaged portion 64. After the rod string 62 has broken, an uphole portion of the rod string 62 may be pulled from the production string 60 and a downhole portion of the rod string 62 may be fished from the production string. Pulling the uphole portion of the broken rod string 62 and fishing the downhole portion of the broken rod string 62 are each time consuming and costly. A space P02 between a first pin end 44 of the first tubing joint 40 and a second pin end 46 of the second tubing joint may facilitate accumulation of particulates and other debris between the connector P01 and the rod string 62. Rod wear is particularly likely to result in damage to the rod string 62 at the space P02. While the rod string 62 is shown with the damaged portion 64 resulting from knuckling, other types of rod wear may result in a rotary rod string, and other types of rod wear may result in a reciprocating rod string.

Protective Connector

Figure 2:
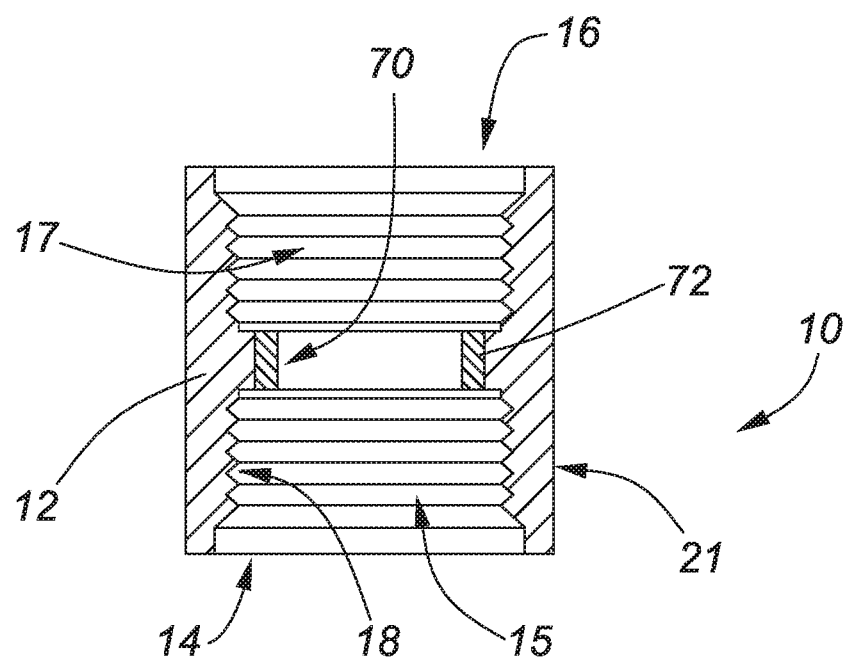
FIG. 2 is a cross-sectional view of a connector as described herein.

FIG. 2 shows a connector 10 in cross section. The connector 10 has a body 12 extending between a first end 14 and a second end 16. An inside surface 18 of the body 12 includes threading along a first connection portion 15 of the body 12 extending from the first end 14 and along a second connection portion 17 of the body 12 extending from the second end 16. The threading may be any suitable threading, such as an interference fit threading. The threading may be an American Petroleum Institute ("API") standard interference fit threading compatible with commonly-used production tubing joints and other tubulars. An outside surface 21 of the body 12 defines a box end along each of the first and second connection portions 15, 17 of the body 12. The body 12 includes a protective portion 70 extending along at least a portion of the inside surface 18 between the first connection portion 15 and the second connection portion 17. The protective portion 70 includes a protective material 72 secured with the inside surface 18. The protective portion 70 defines a protective portion inside diameter 71 of the connector 10. The protective portion inside diameter 71 includes the inside diameter of the body 12 further narrowed by the thickness of the protective material 72.

Figure 3:
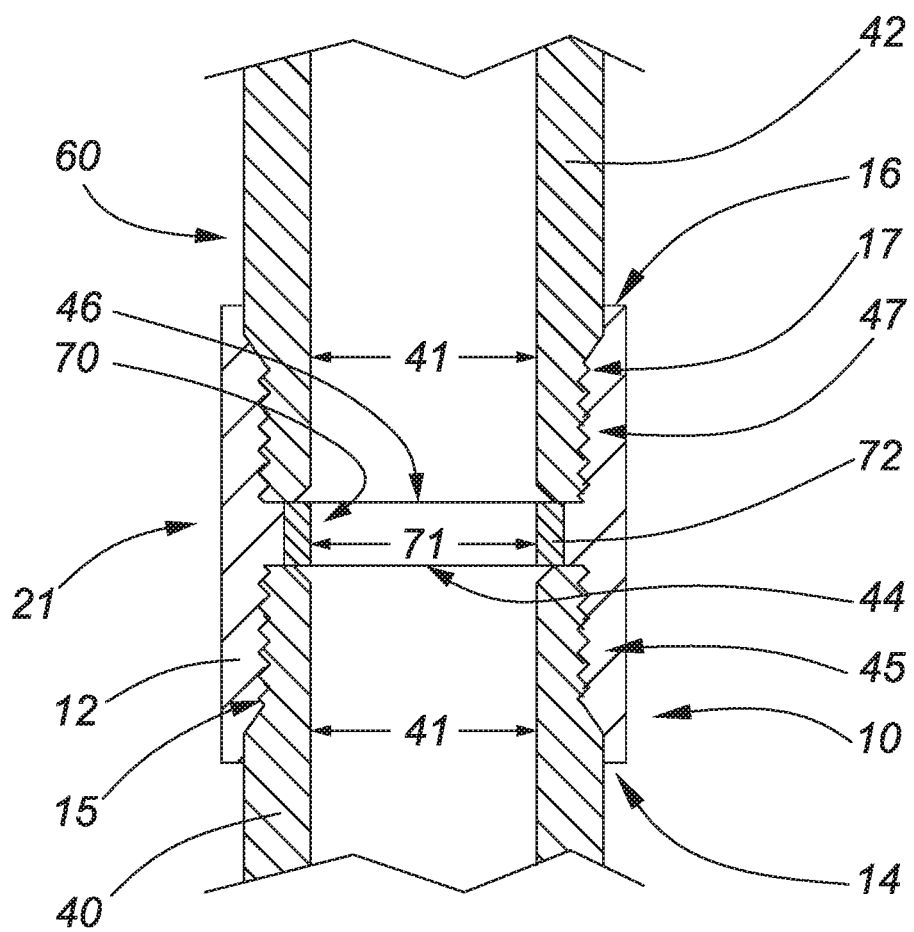
FIG. 3 is a cross-sectional view of a production string with production tubing joints connected with the connector of FIG. 2.

FIG. 3 shows a cross section of the connector 10 connected with a first tubing joint 40 and a second tubing joint 42 in a production string 60. The first connection portion 15 is connected with a first tubing connection portion 45 of the first tubing joint 40 proximate the first pin end 44 of the first tubing joint 40. The first connection portion 15 has sufficient axial depth to connect with the first tubing connection portion 45. The second connection portion 17 is connected with a second tubing connection portion 47 of the first tubing joint 42 proximate the second pin end 46 of the second tubing joint 42. The second connection portion 15 has sufficient axial depth to connect with the second tubing connection portion 47.

The protective material 72 is softer than the grades of steel or other materials typically used to manufacture production tubing connectors. The protective material 72 is also softer than the grades of steel or other materials typically used to manufacture rod joints, connectors, continuous rod, or other components of the rod string 62. As illustrated by the examples of the protective material 72 provided below, the protective material 72 may b selected to be sufficiently soft that rotation or translation of the rod string 62 against the protective material 72 will degrade the rod string 62 less than rotation or translation of the rod string 62 while urged against the body 12. The protective material 72 may also be selected to be sufficiently durable that the life of the connector 10 and the mitigation to rod wear provided by the connector 10 are extended. The protective material 72 may also be selected for a low coefficient of friction with the rod string 62 relative to the grades of steel or other materials typically used to manufacture production tubing connectors. The low coefficient of friction is selected to allow the rod string 62 to rotate relatively freely when urged against the protective material 72. As a result, the protective material 72 is less abrasive and otherwise destructive to the rod string 62 when the rod string 62 is urged against the protective material 72 and rotated, compared with the grades of steel or other materials typically used to manufacture production tubing connectors.

The protective portion inside diameter 71 of the body 12 and the protective material 72 along the protective portion 70 may be equal to or narrower than an inside diameter of the body 12 elsewhere between the connection portions 15, 17 or otherwise on the body 12. The protective portion inside diameter 71 may be equal to a production tubing inside diameter 41 of the production tubing joints 40, 42 (as shown in FIG. 3). The protective portion inside diameter 71 may be equal to or narrower than the production tubing inside diameter 41, with an example of a connector with a narrower inside diameter at the protective portion shown in FIGS. 6 and 7. As a result of the protective portion inside diameter 71 being equal to or narrower than elsewhere along the inside surface between the connection portions 15, 17, the rod string 62 may contact the connector 10 at the protective portion 70 preferentially to other features of the connector 10 when the rod string 62 is urged against the production string 60.

Where the tubing joints 40, 42 include an external upset end ("EUE") connection, the production tubing inside diameter 41 may be greater proximate the pin ends 44, 46 of the tubing joints 40, 42. In the figures provided herein, the tubing joints are shown schematically with a constant inside diameter for simplicity. However, with EUE tubing joints, having a protective portion inside diameter 71 that is narrower than the inside diameter 41 in the tubing joints 40, 42 along the first and second tubing connection portions 45, 47 would also be narrower than the inside diameter in the tubing joints 40, 42 outside of the EUE portion, as the EUE tubing joints would have a greater inside diameter outside of the first and second tubing connection portions 45, 47.

The rod string 62 contacts the protective portion 70 preferentially or along with other portions of the connector 10 when the rod string 62 is urged against the production string 60 where the protective portion inside diameter 71 is equal to or less than the inside diameter elsewhere in the production string 60. The protective material 72 is less abrasive than the steel body of previous tubing connectors, or the body 12. As a result, the connector 10 may mitigate rod wear compared with previous pipe connectors.

The protective portion 70 differs from other portions of the inside surface 18 in its hardness, coefficient of friction with the rod string 62, or other features that mitigate abrasion of the rod string 62 when rotated while urged against the protective portion 70, particular examples of which for a given connector may be provided by selection of an appropriate protective material 72. The protective portion 70 also differs from other portions of the inside surface 18 in that the protective portion inside diameter 71 of the body 12 and the protective material 72 along the protective portion 70 is equal to or narrower than the inside diameter of the body 12 at other points in the connector 10. The protective portion 70 may include any suitable protective material 72 and may be prepared and secured to the body 12 by any suitable method.

Figure 4:
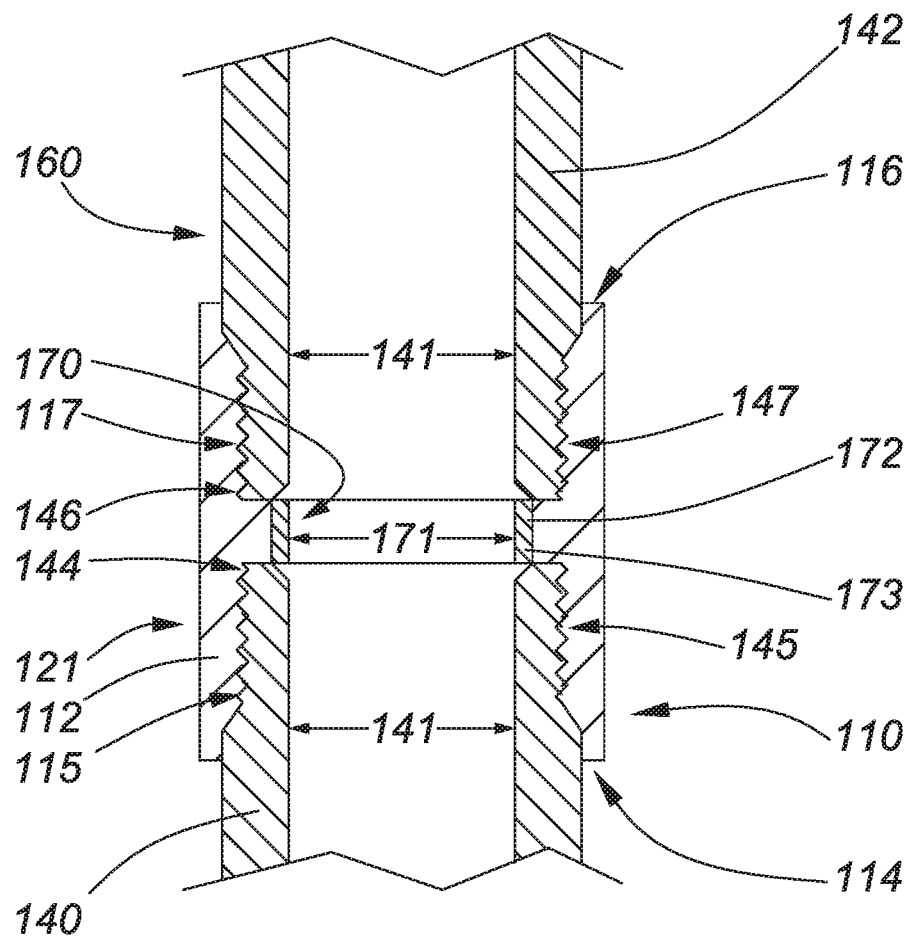
FIG. 4 is a cross-sectional view of a production string with production tubing joints connected with a connector having a protective coating.

FIG. 4 shows a connector 110 connected with the production tubing joints 140, 142 in the production string 160. The protective portion 170 includes a protective coating 173 of the protective material 172 on the body 112. The protective coating 173 is permanently secured to the body 112 by chemical bonding. Any suitable protective material 172 may be used for the protective coating 173, such as a thermally set resin, an extrusion set coating, a metallic alloy coating, or other coating. An example of a thermally set resin is zEro 100 coating by zEroCor Tubulars Inc, which is a zirconium fusion-bonded epoxy powder coating with a pencil hardness (H scale) rating of 6H and a low friction coefficient.

Extrusion set coatings may include phenolic, nylon, or novolac based coatings, which may be applied as powder or liquid to form a coating, or modified examples of such coatings. Such coatings are marketed online at www.nov-.com as "Tube-Kote Production Coatings", including TK-2 Liquid Phenolic, TK-7 Liquid-Modified Phenolic, TK-15 Powder-Modified Novolac, TK-69 Liquid-Epoxy Modified Phenolic, TK-70 Powder-Epoxy, TK-70XT Powder-Epoxy, TK-99 Powder-Nylon, TK-216 Powder-Epoxy, TK-236 Powder-Epoxy-Novolac, TK-505 Powder-Epoxy, TK-800 Powder-Modified Epoxy, TK-805 Powder-Phenolic Novolac, or TK-900 Powder-Modified Novolac.

Metallic alloy coatings may include the MAC-100 Corrosion Control coating with sliding wear capabilities, marketed online at www.pcscanada.ca, which has a hardness of 49 Rockwell C, a wear resistance of 12-16 on the Taber wear index, and a dynamic coefficient of friction of about 0.15, a tensile strength of 800 MPa, and a modulus of elasticity of 170 GPa.

Figure 5:
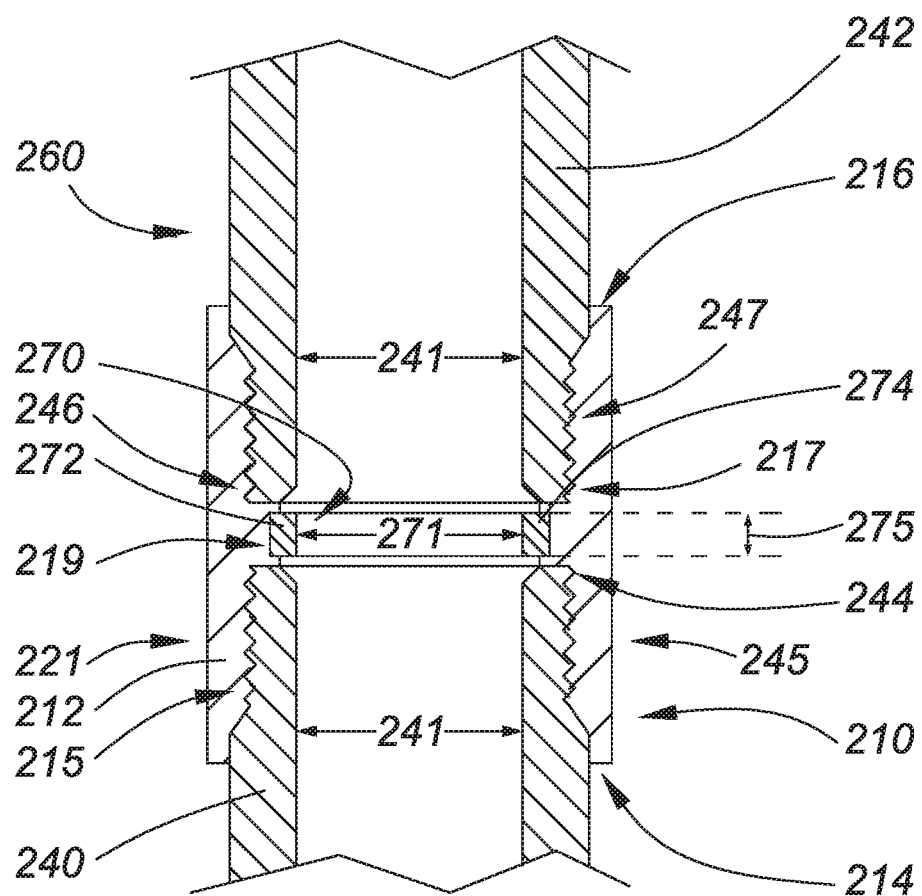
FIG. 5 is a cross-sectional view of a production string with production tubing joints connected with a connector having a protective sleeve.

FIG. 5 shows a connector 210 connected with the production tubing joints 240, 242 in the production string 260. The protective portion 270 includes a sleeve 274 secured within a groove 219 defined in the body 212. The sleeve 274 may include a split 275 to facilitate securing the sleeve 274 within the groove 219. Any suitable protective material 272 may be used for the sleeve 274, such as high-density polyethylene, ultra-high molecular weight polyethylene, or nylon. The sleeve 274 may be prepared from an ultra-high molecular weight polyethylene with a hardness of about 65 Shore D and a dynamic coefficient of friction of about 0.10. The sleeve 274 may be prepared from nylon with a hardness of between about 75 and 85 Shore D, and a dynamic coefficient of friction of about 0.20. The protective portion inside diameter 271 of the sleeve 274 is substantially equal to the inside diameter of the production tubing joints 240, 242 along the tubing connection portions 245, 247, providing preferential contact between the sleeve 274 and a rod string passing through the connector 210.

Figure 6:
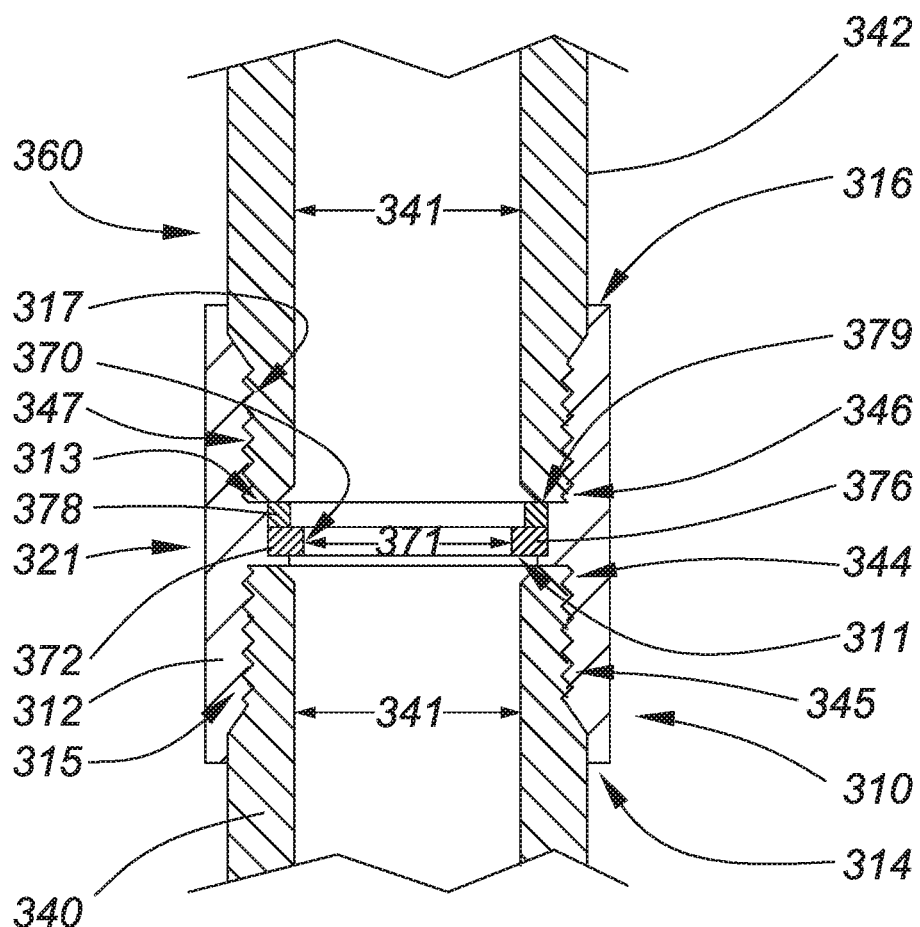
FIG. 6 is a cross-sectional view of a production string with production tubing joints connected with a connector having a protective sleeve secured with a ring.
Figure 7:
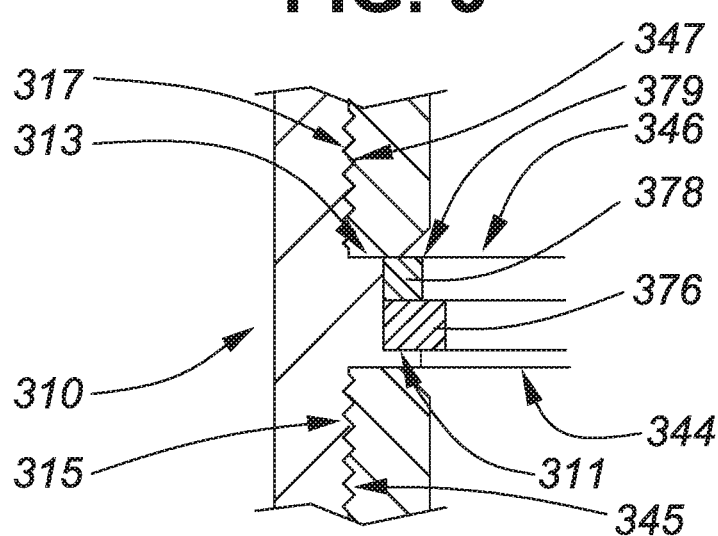
FIG. 7 is a cross-sectional detail view of stops defined in a body of the connector of FIG. 6.

FIGS. 6 and 7 show a connector 310 connected with the production tubing joints 340, 342 in the production string 360. A sleeve 376 may be secured within the body 312 against a stop 311. The sleeve 376 may be secured between the stop 311 and a press ring 378. The press ring 378 may be secured against the sleeve 376 with an outside surface 379 of the press ring 378 flush with the stop 313 as shown to provide a flush surface for the pin end 344 in the connection portion 317. The sleeve 376 may be prepared from protective material 372 similar to the protective material 272 used in the sleeve 274. The protective portion inside diameter 371 of the sleeve 376 is narrower than the inside diameter of the production tubing joints 340, 342 along the tubing connection portions 345, 347, providing preferential contact between the sleeve 376 and a rod string passing through the connector 310.

For example, the connector 310 may be designed for used with a 3.5" API EUE production tubing with a weight of 9.30 lb/ft, which has an inside diameter of 2.992" along the tubing connection portions 345, 347, and a drift of 2.867". A connector 310 designed for use with such tubing may have a value of the protective portion inside diameter 371 of the sleeve 376 of 2.967", which would provide a 0.025" reduction in the protective portion inside diameter 371 of the sleeve 376 relative to the tubing inside diameter 341, while remaining 0.100" above the drift of the production tubing joints 340, 342.

Extended Protective Connector

Figure 8:
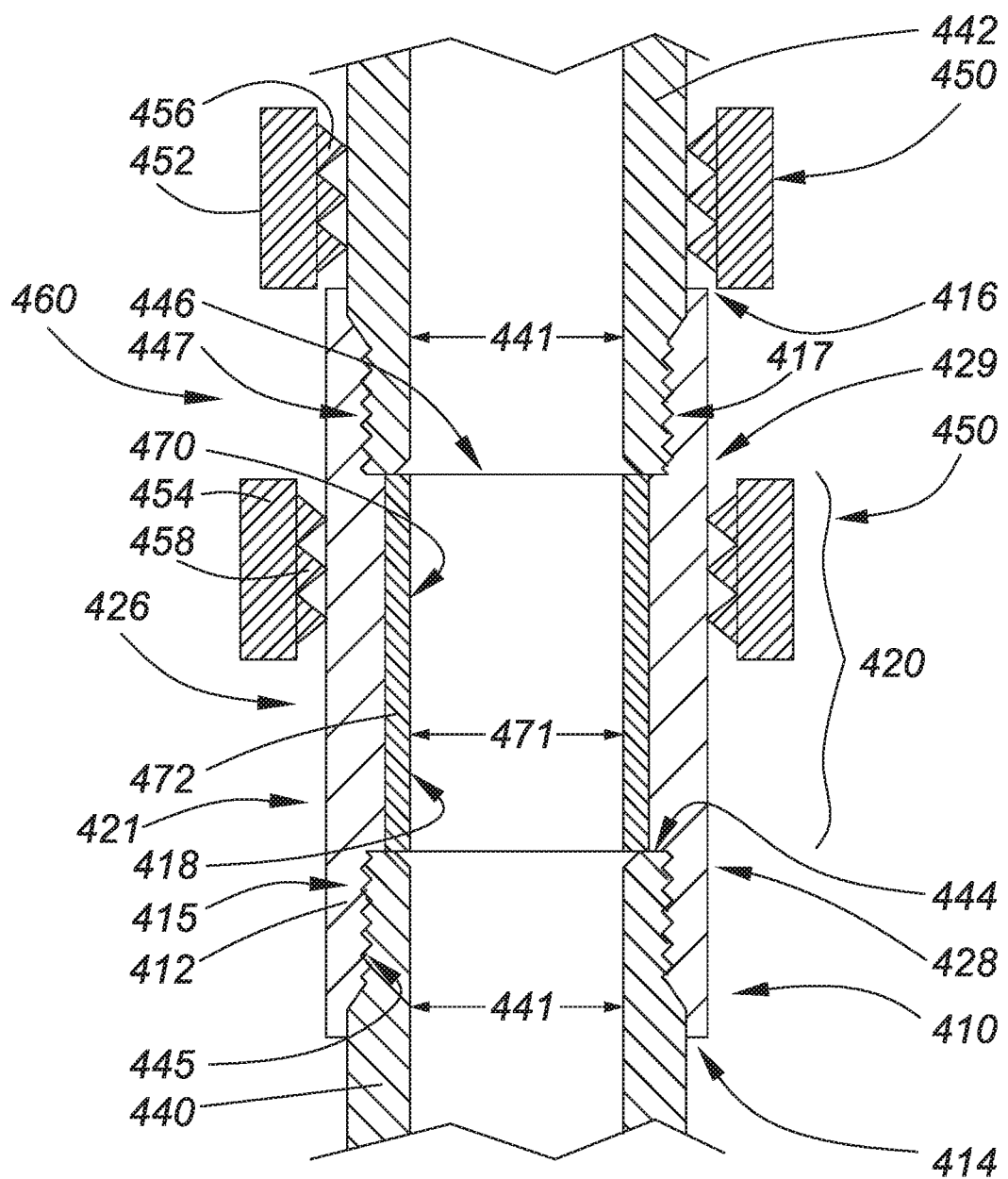
FIG. 8 is a cross-sectional view of a connector with a gripping surface being connected with a tubing joint using a pair of power tongs.

FIG. 8 shows a connector 410 connected with the production tubing joints 440, 442 in the production string 460. The connector 410 includes including a tong gripping portion 420. The connector 410 and the second production tubing joint 442 are being gripped by power tongs 450. The tong gripping portion 420 extends along the outside surface 421 of the body 412 coextensive with neither of the connection portions 415 nor 417 on the inside surface 418.

A tong gripping surface 426 is defined on the outside surface 421 of the body 412 along the tong gripping portion 420. The tong gripping portion 420 may be gripped by the power tongs 450 with less risk of damage to the connector 410 than if either of the connection portions 415, 417 is gripped, particularly where the threaded connections portion 415, 417 being gripped is connected with a threaded tubing connection portion of a tubing joint, such as the first tubing connection portion 445 of the first tubing joint 440 or the second tubing connection portion 447 of the second tubing joint 442.

A first gripping transition point 428 separates the tong gripping portion 420 from the first connection portion 415. A second gripping transition point 429 separates the tong gripping portion 420 from the second connection portion 417. The gripping transition points 428, 429 each define a boundary of the tong gripping portion 420. In the connector 410, the tong gripping portion 420 is adjacent the connection portions 415, 417 and the gripping transition points 428, 429 each define a boundary with between the tong gripping surface 420 and one of the two gripping transition points 428, 429.

The gripping transition points 428, 429 are a feature of the inside surface 418 in that there is no threading on the inside surface 418 within the tong gripping portion 420 as defined by the gripping transition points 428, 429. The gripping transition points 428, 429 are also a feature of the outside surface 421 in that the tong gripping surface 426 is defined along the outside surface 421 within the tong gripping portion 420 as defined by the gripping transition points 428, 429.

The pair of power tongs 450 shown in FIG. 8 are being used to connect the first tubing joint 440 with the second tubing joint 442 using the connector 410. The power tongs 450 include a powered tong 452 and a backup tong 454. The powered tong 452 includes powered tong dies 456 for contacting a pipe or connector being gripped and rotated. The backup tong 454 includes backup tong dies 458 for contacting a pipe or connector being held static relative to a pipe or connector being rotated by the powered tong 452. The first tubing connection portion 445 of the first tubing joint 440 is engaged with the first connection portion 415, which is on a mill side of the connector 410 with respect to the power tongs 450. The second tubing connection portion 447 of the second tubing joint 442 is engaged with the second connection portion 417, which is on a field side of the connector 410 when being connected with the power tongs 450.

Where the power tongs 450 are used to make up or break a connection between the connector 410 and the second tubing joint 442, the powered tong 452 grips the second tubing joint 442 and the backup tong 454 grips the connector 410 on the gripping portion 420 (as shown in FIG. 8). The backup tong 454 holds the connector 410 stationary relative to the second tubing joint 442 as the powered tong 452 is used to rotate the second tubing joint 442 relative to the connector 410 to make up or break the connection between the connector 410 and the second tubing joint 442.

Where the power tongs 450 are used to make up or break a connection between the connector 410 and the first tubing joint 440 (not shown), the powered tong 452 grips the connector 440 on the gripping portion 420 and the backup tong 454 grips the first tubing joint 440. The backup tong 454 holds the first tubing joint 440 stationary relative to the connector 410 as the powered tong 452 is used to rotate the connector 410 relative to the first tubing joint 440 to make up or break the connection between the connector 410 and the first tubing joint 440.

Where the power tongs 450 are used to break a connection between the connector 410 and the second tubing joint 442 or the first tubing joint 440, the gripping portion 420 may also provide a surface that may be hammered on to assist in breaking the connection without hammering on an outer surface of the body 412 coextensive with either of the connection portions 415, 417.

The tong gripping portion 420 extends along the outside surface 421, defining the tong gripping surface 426, for a gripping length at least as long as the dies 456, 458 on the power tongs 450 that will be used to rotate the connector 410 or tubing joints 440, 442 to make up or break a connection between the connector 410 and one of the tubing joints 440, 442. The lengths of the dies 456, 458 are selected with reference to the outside diameter of the connector 410 and of well tubing with which the connector 410 will be used, the torque required to make up the connection, and the application of the well tubing. As a result, the gripping length of the tong gripping portion 420, which is selected with reference to the length of the dies 456, 458, is also indirectly selected with reference to these factors. For example, on power tongs 450 usable with pipes having outside diameters of between about 3.5" and about 5.5", backup tong dies 458 may have a die length of about 1.5" and powered tong dies 456 may have a die length of about 3.0". The gripping portion 420 would be at least 3.0" long for use with such power tongs 450, and may be about 5", allowing a one-inch margin on each side of a power tong die 456 or 458 located at the center of the gripping portion 420. Where the connector 410 is designed for use on smaller or larger outside diameter tubing, the gripping portion 420 would be correspondingly smaller or larger to accommodate the smaller or larger die sizes on power tongs 450 that would be used on such smaller or larger outside diameter tubing or other pipes.

As with the connectors lacking the gripping portion 420, the protective portion 470 may include any suitable protective material 472 and may be prepared and secured to the body 412 by any suitable method as described above with respect to FIGS. 4 to 7. The additional length of the protective portion 470 may improve mitigation of damage to a rod string relative to the shorter connectors shown in FIGS. 2 to 7.

Figure 9:
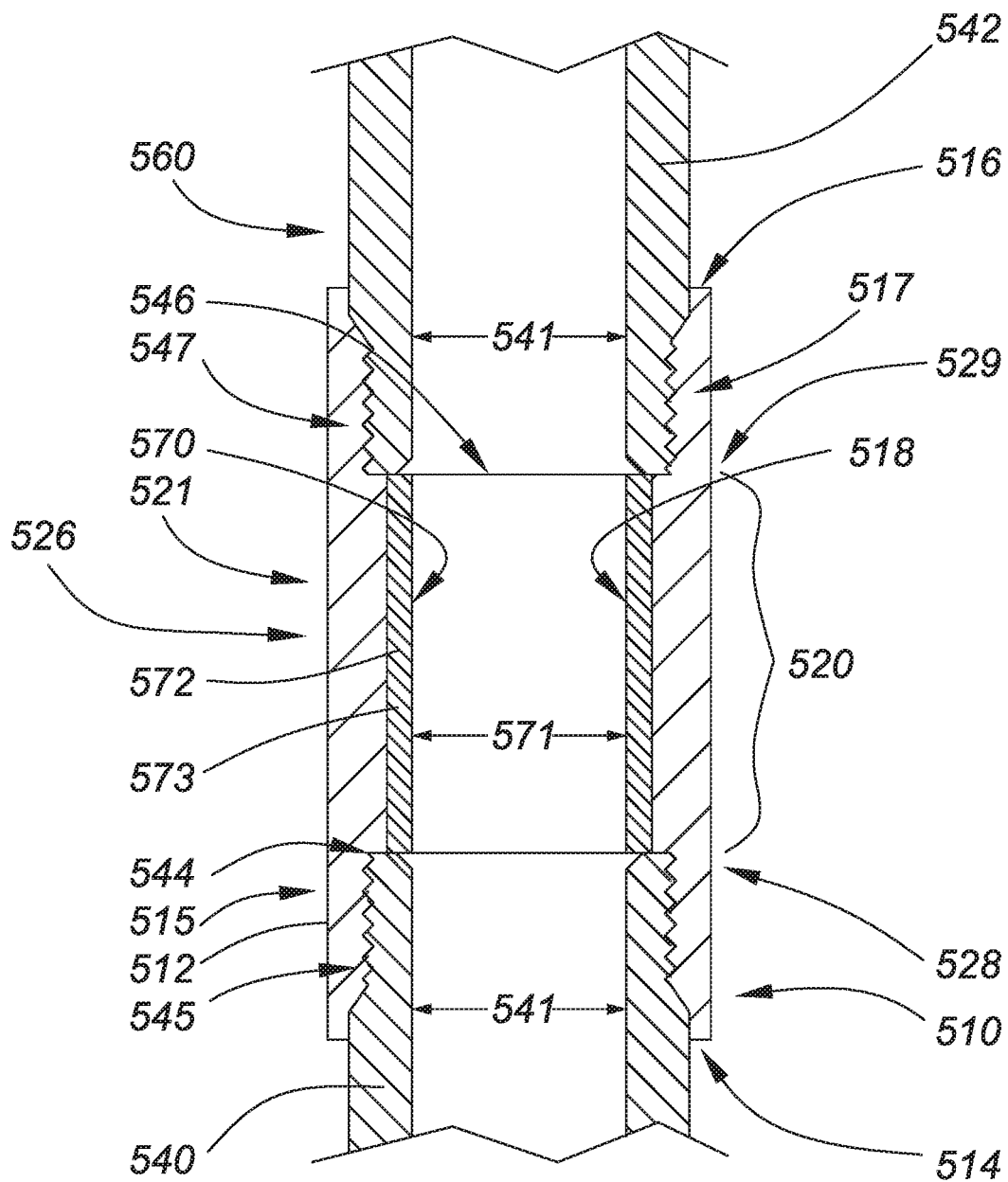
FIG. 9 is a cross-sectional view of a production string with production tubing joints connected with a connector having a gripping surface and a protective coating.

FIG. 9 shows a connector 510 in which the protective portion 570 includes the protective coating 573.

Figure 10:
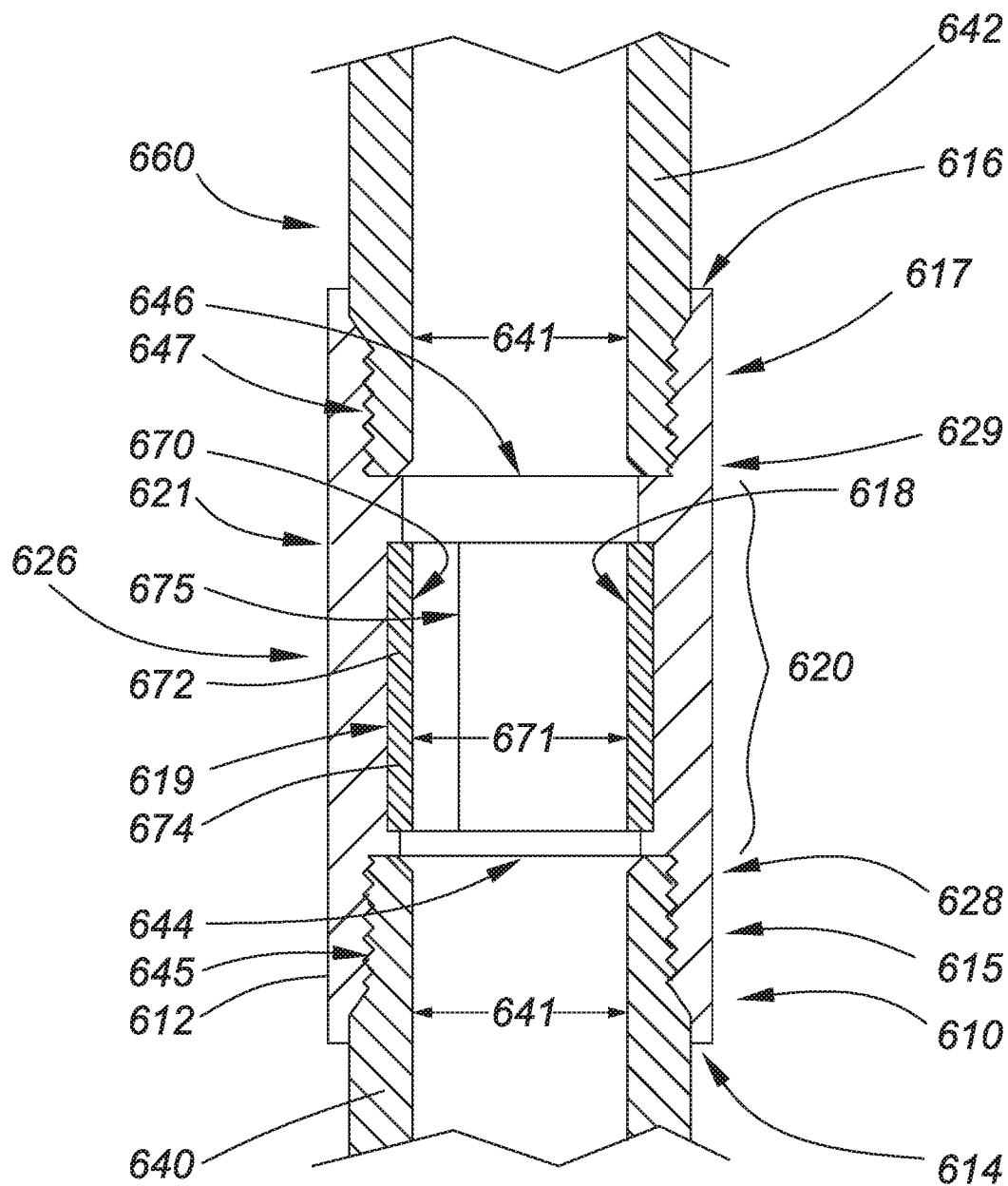
FIG. 10 is a cross-sectional view of a production string with production tubing joints connected with a connector having a gripping surface and a protective sleeve.

FIG. 10 shows a connector 610 in which the protective portion 670 includes the sleeve 674 secured within the groove 619 defined in the body 612.

Figure 11:
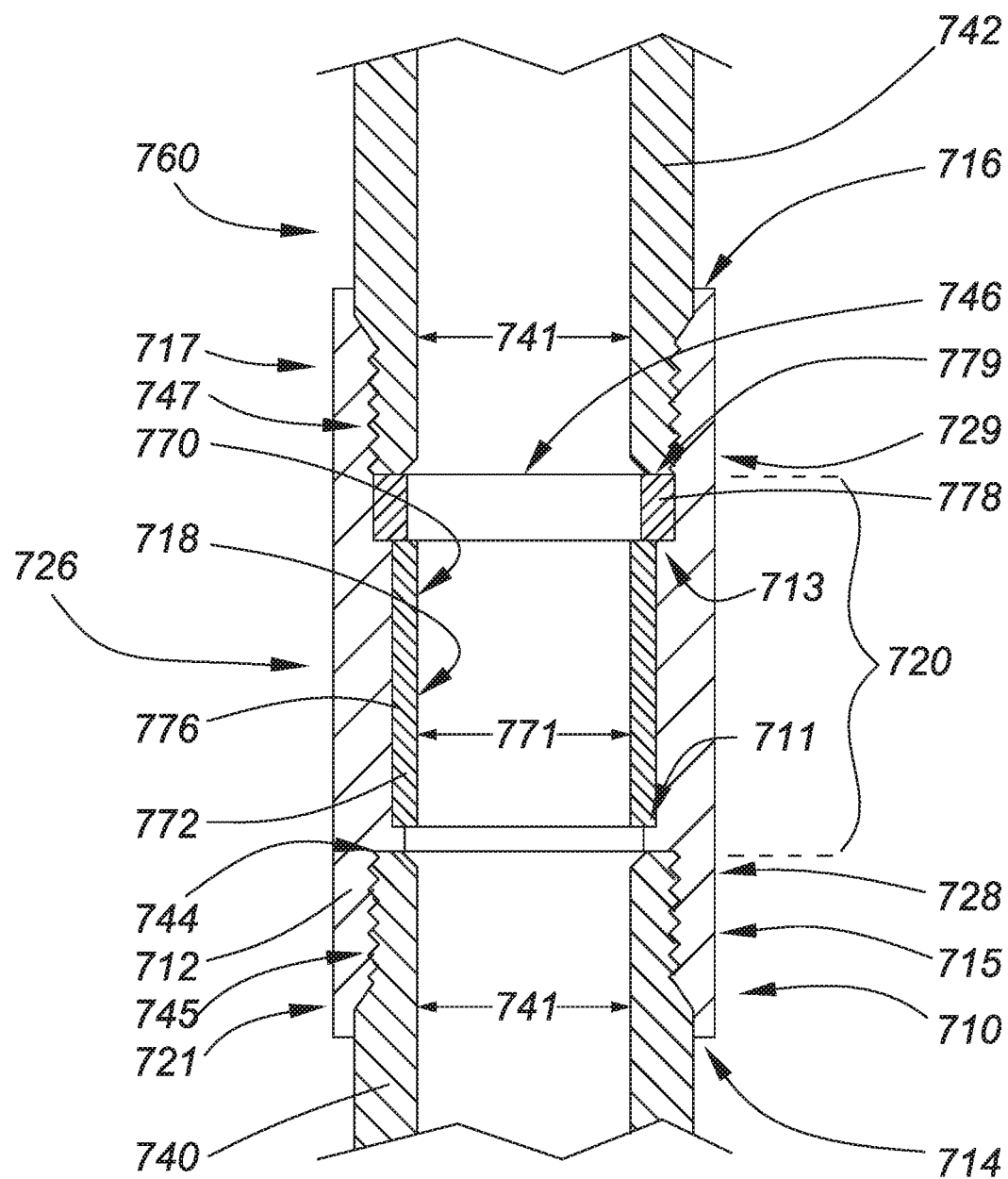
FIG. 11 is a cross-sectional view of a production string with production tubing joints connected with a connector having a gripping surface and a protective sleeve secured with a ring.

FIG. 11 shows a connector 710 in which the sleeve 776 is secured between the stop 711 and the press ring 778. The sleeve 776 and the press ring 778 may be simpler to manufacture and secure to the connector 710 than the connector 310 because of the greater length of the body 712 compared with the body 310. As a result, the sleeve 776 and the press ring 778 may be larger, easier to handle, simpler to manufacture to specification, and simpler to assemble with the body 712, than the smaller sleeve 376 and press ring 378 with respect to the smaller body 312.

Recessed Gripping Portion

Figure 12:
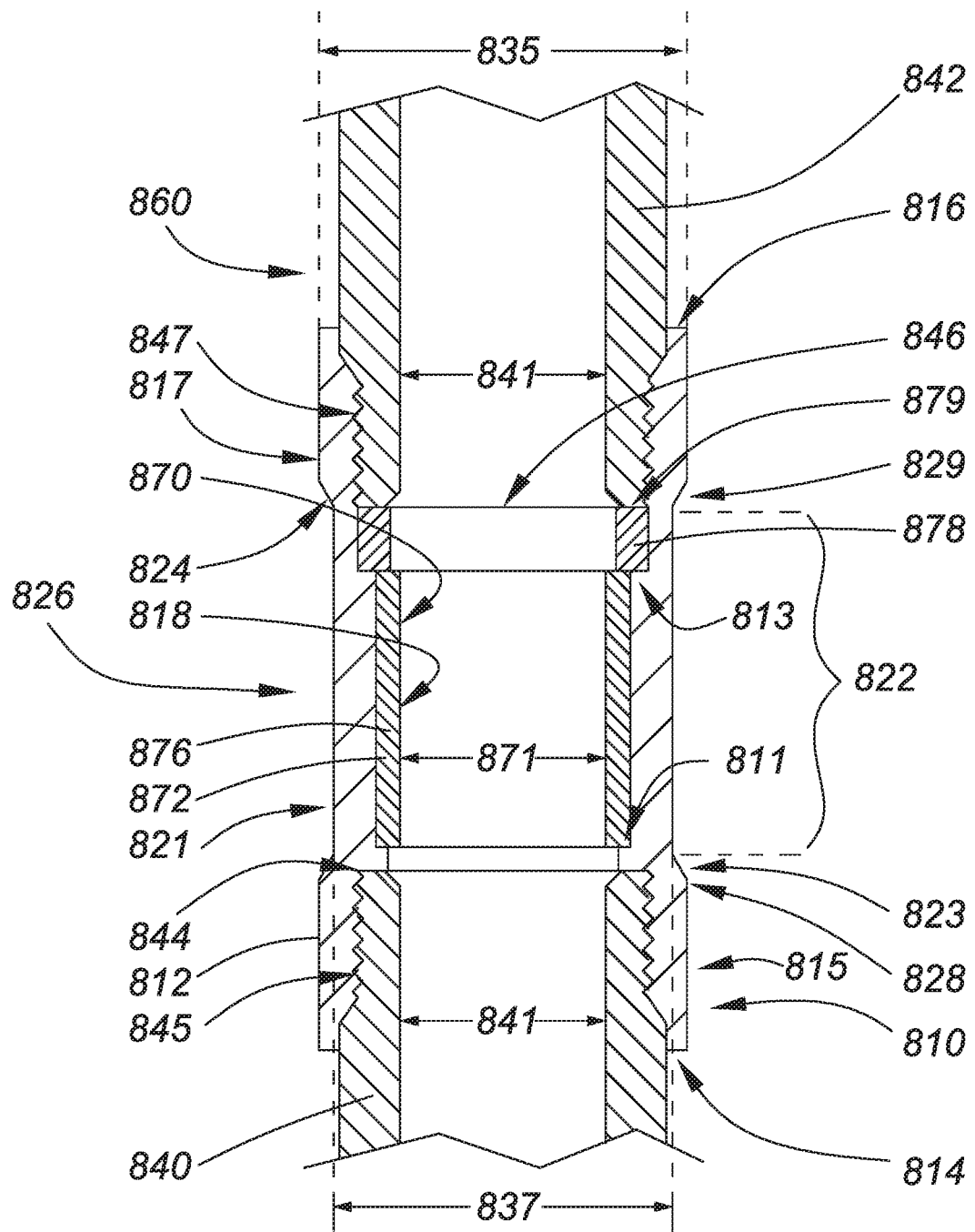
FIG. 12 is a cross-sectional view of a production string with production tubing joints connected with a connector having a recessed gripping surface and a protective sleeve secured with a ring.

FIG. 12 shows a connector 810 wherein a recessed tong gripping portion 822 in the body 812 is defined both by the absence of the connection portions 815, 817, and by a change in outside diameter of the body 812. The body 812 has a first outside diameter 835 along the connection portions 815, 817 and a second outside diameter 837 along the recessed tong gripping portion 822. The first outside diameter 835 is greater than the second outside diameter 837. The change in outside diameter of the body 812 intermediate the first end 814 and the recessed tong gripping surface 822 is a result of a first taper in the profile of the body 812 outside diameter at a first outside diameter transition point 823. The change in outside diameter of the body 812 intermediate the second end 816 and the recessed tong gripping surface 822 is a result of a second taper in the profile of the body 812 outside diameter at a second outside diameter transition point 824 of the body 812. In the connector 810, the first outside diameter transition point 823 is at a portion of the body 812 that includes the first gripping transition point 828. Similarly, the second outside diameter transition point 824 is at a portion of the body 812 that includes the second gripping transition point 829. The change in outside diameter at the outside diameter transition points 823, 824 may be effected by the taper in the profile of the body 812 as shown in the connector 810 or otherwise (e.g. steps, etc.).

Figure 18:
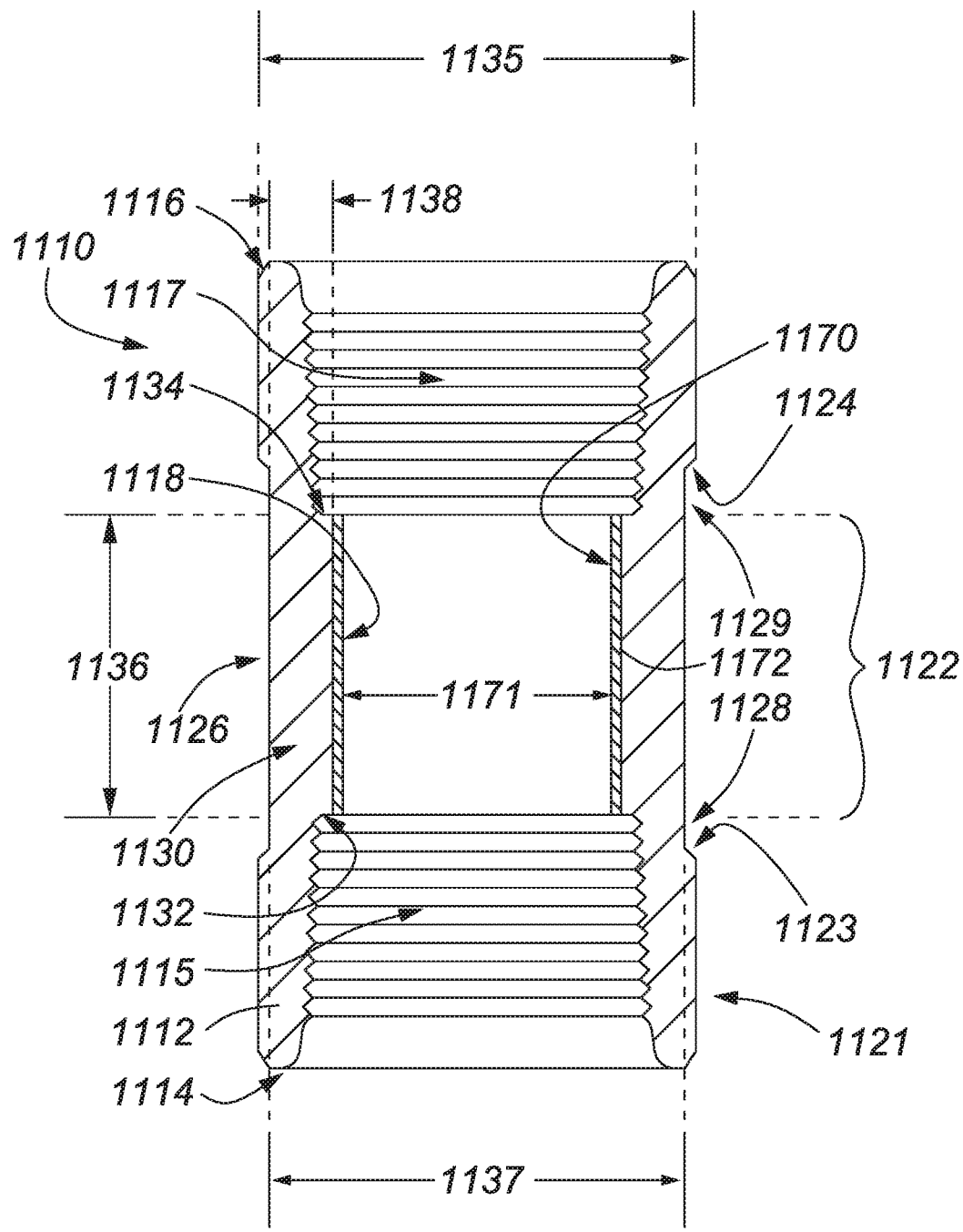
FIG. 18 is a cross-sectional view of a connector having a recessed gripping surface and a reinforced portion.
Figure 19:
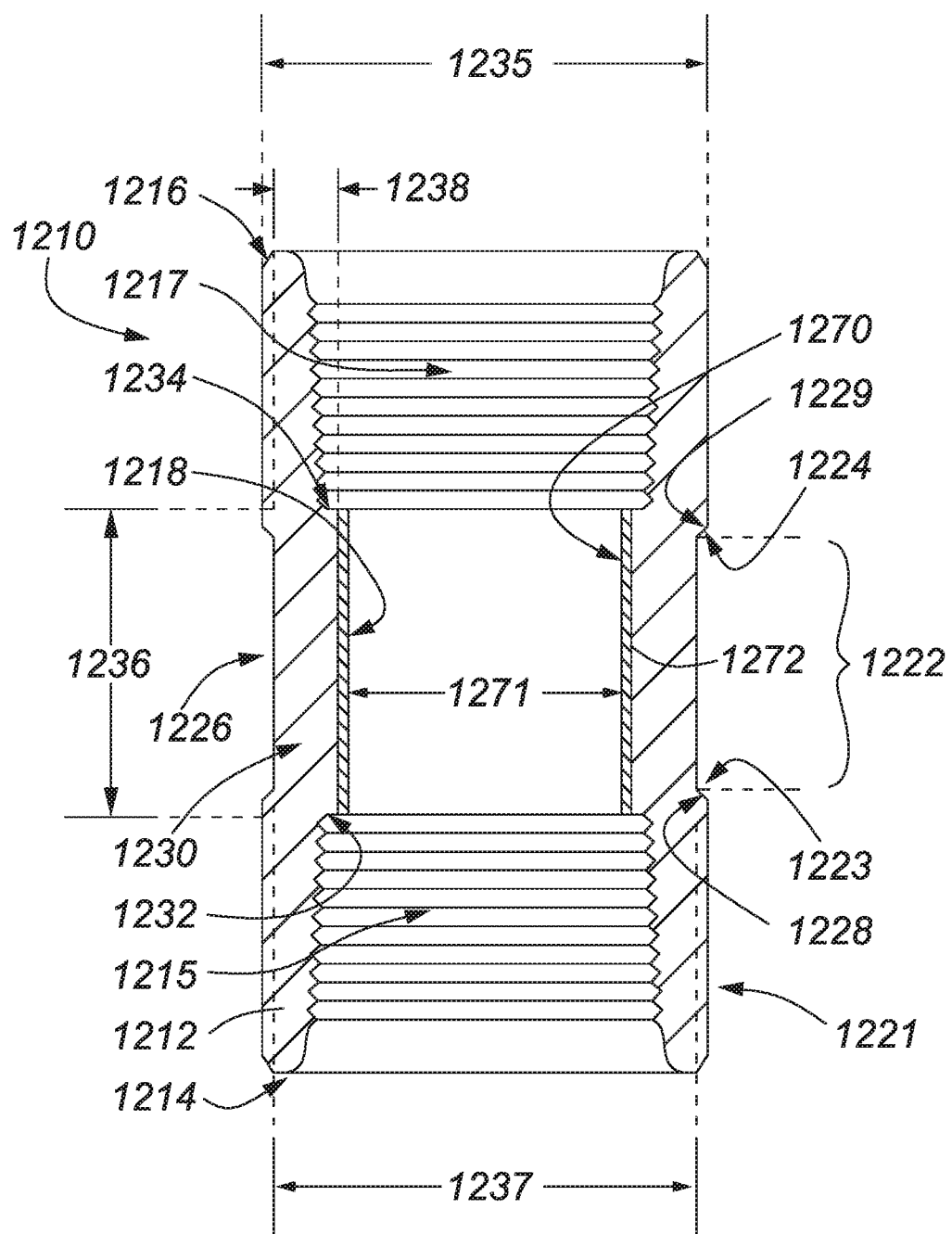
FIG. 19 is a cross-sectional view of a connector having a recessed gripping surface and a reinforced portion.

In the connector 810 as shown, the locations along the body 812 of the outside diameter transition points 823, 824 each coincide with the locations along the body 812 of the gripping transition points 828, 829. As shown in FIGS. 18 and 19, the outside diameter transition points may be located at portions of the body other than the gripping transition points, or may be located at portions of the body that limit the gripping surface length to a smaller length than the axial separation between the connection portions. Where the change in outside diameter of the body is at a portion of the body other than the transition points, the connection portions provide sufficient axial depth to engage threaded pin portions of tubing joints without the recessed gripping portion engaging the tubing joints and the recessed gripping portion provides sufficient axial length for the power to grip on the tong gripping surface with the powered dies and the backup dies.

The change in outside diameter may be at portions of the body 812 other than the gripping transition points 828, 829, for example in the connectors 1110 and 1210 shown in FIGS. 18 and 19. The gripping transition points 828, 829 each respectively define boundaries of the recessed gripping portion 822 in terms of a lack of threading on the inside surface 818 and in terms of the tong gripping surface 826 on the outside surface 821. In contrast, the outside diameter transition points 823, 824 each define a boundary between different outside diameter values of the body 812. The axial separation between the outside diameter transition points may be greater than the axial separation between the gripping surface transition points, such as in the connector 1110 of FIG. 18. In such a case, the outside diameter transition points are within the connection portions and the gripping surface has a shorter length than the portion body having the reduced diameter. Conversely, the outside diameter transition points may be separated by a smaller axial distance than the length of the separation between the connection portions, such as in the connector 1210 of FIG. 19. In such a case, the outside diameter transition points and the gripping surface transition points coincide as shown in FIG. 19, as the tong gripping portion is defined by the tong gripping surface on the outside surface (in addition to the absence of threading on the inside surface), which has a sufficient length at the reduced diameter to be gripped by the power tongs, and the sufficient length is only found between the outside diameter transition points.

The recessed gripping portion 822 and the corresponding tong gripping surface 426 provide a location for tonging onto that is simple to locate visually or by touch, and that an operator can be confident is free of threading on the inside surface 818. The recessed nature of the recessed gripping portion 822 facilitates locating the recessed gripping portion 822 quickly relative to the gripping portion 720 of the connector 710. Locating the recessed gripping portion 822 may be facilitated both by the visual distinction offered by a change in the outside diameter between the first outside diameter 835 to the second outside diameter 837, and by use of power tongs to locate the change in outside diameter while translating a powered or backup tong along the connector 810 until the operator feels a change in outside diameter. Facilitated locating of the recessed gripping portion in turn facilitates gripping the connector 810 on the recessed gripping portion 822 with the power tongs.

Reinforced Connector

Figure 13:
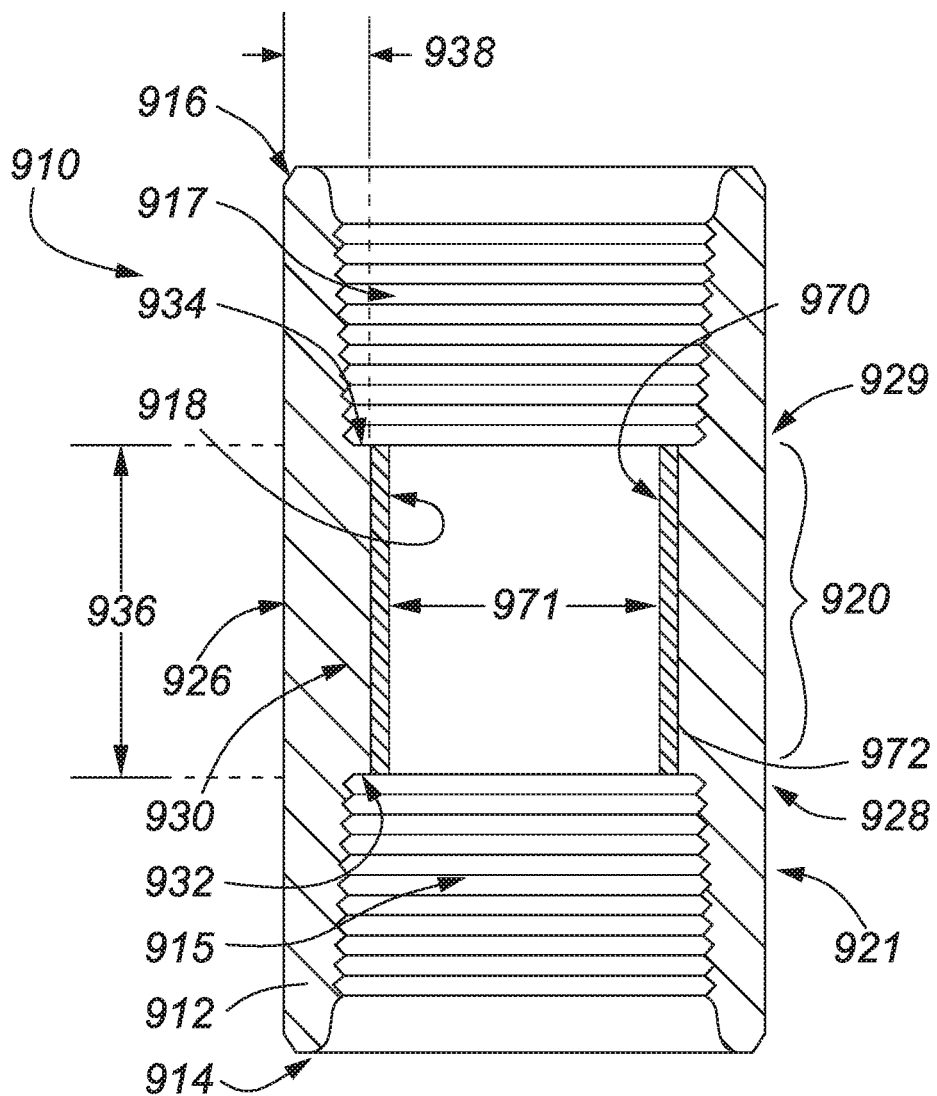
FIG. 13 is a cross-sectional view of a connector having a gripping surface and a reinforced portion.

FIG. 13 shows a connector 910 having a body 912 including a reinforced portion 930.

Figure 14:
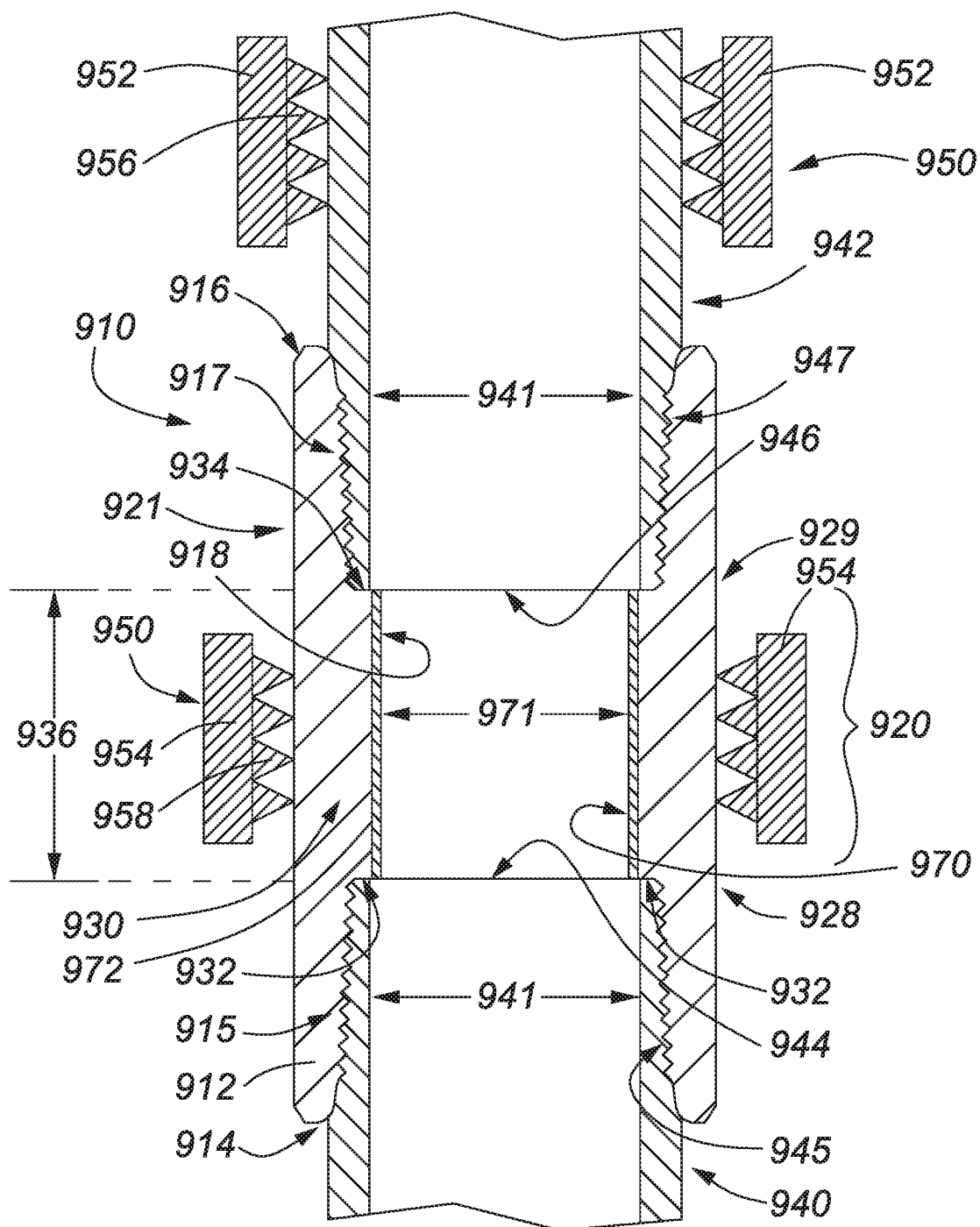
FIG. 14 is a cross-sectional view of the connector of FIG. 13 being connected with a tubing joint and torqued above API optimum value using power tongs.

FIG. 14 shows the connector 910 connected with the production tubing joints 940, 942 in the production string 960. The connector 910 and the second production tubing joint 942 are being gripped by power tongs 950

The reinforced portion 930 extends along a reinforced length 936 of the body 912 intermediate the connection portions 915, 917. The reinforced portion 930 extends axially between approximately the first gripping transition point 928 and the second gripping transition point 929. On the inside surface 918, the reinforced portion 930 extends between a first torque stop 932 proximate the first transition point 928 and a second torque stop 934 proximate the second transition point 929. The body 912 has a wall thickness 938 along the reinforced length 936. The wall thickness 938 is with reference to the body 912 and does not include any thickness of the protective portion 970, which is made from the protective material 972 and not from the harder steel or other material used to manufacture the body 912 (although the thickness of the protective material 972 is included in the protective portion inside diameter 971). The wall thickness 938 is selected to provide strength and resistance to deformation to the body 912. Without being bound by any theory, an increased torque to turn ratio of connections with the connection portions 915, 917 relative to that observed in previous connectors may be provided by the reinforced portion 930. By providing some level of control over the makeup torque and the torque to turn ratio of the connection portions 915, 917 without changing the thread pattern, the reinforced portion 930 facilitates using the connector 910 to connect sections of pipe with commonly used thread patterns to be made up at a greater torque than with previous connectors.

Increasing the length 936 of the reinforced portion 930, increasing the wall thickness 938 of the body 912 along the reinforced portion 930, or manufacturing the body 912 from a stronger grade of steel, will each increase the strength and resistance to deforming of the body 912. These increases in strength and resistance to deforming in turn facilitate connecting the tubing joints 940, 942 with the connector 910 at a higher torque value for the same number of turns while reducing the chances of galling or other failure of the tubing joints 940, 942 or the connector 910. The gripping surface 920 provides a low-risk location on the body 912 for applying the greater gripping forces required to apply the higher torque values enabled by the reinforced portion 930.

The connector 910 may also include a reinforced portion extending along a lesser extent of the body 912 between the connection portions 915, 917. In this case the reinforced portion would still be engineered to contribute sufficient strength and resistance to deformation to the body 912 to allow connections to be made up at a particular torque value. The reinforced portion 930 has a sufficient length 936 such that the wall thickness 938 need not extend into a flow passage within the connector to such an extent as to narrow the flow passage to lower than the pipe with which the connector 910 will be used. A reinforced portion could also extend outward from the outside surface 921 of the connector body 912 and provide additional strength and resistance to deforming to the body 912. However, adding a reinforced portion to the outside surface 921 of the connector body 912 would also increase the outside diameter of the body 912, likely beyond API specification outside diameter, which in many applications may be a significant drawback.

The make-up point between the connector 910 and the first tubing joints 940 is at the nose of the first pin end 944. Similarly, the make-up point between the connector 910 and the second tubing joint 942 is at the nose of the second pin end 946. When the first tubing joint 940 is connected with the connector 910, the pin end 944 is threaded into the first connector end 914 and abuts the first torque stop 932 of the reinforced portion 930. Similarly, when the second tubing joint 942 is connected with the connector 910, the second pin end 946 is threaded into the second connector end 916 and abuts the second torque stop 934 of the reinforced portion 930.

Keeping the material of the body 912 and thread design on the connection portions 914, 916 constant, the gripping surface 920 and the reinforced portion 930 together allow the tubing joints 940, 942 to be threaded into the connector 910 at a selected torque value greater than with previous connectors (e.g. the connector P01, etc.) in which threaded connector ends are proximate each other.

The gripping portion 920, being at least as long as the longitudinal length of a die 956 or 958 that would be used on power tongs 950 of an appropriate size for the connector 910, is sufficiently long to be easily gripped by the power tongs 950. When using power tongs 950 to install the connector 910, there is no need to grip on a portion of the connector 910 that includes the connection portions 915, 917 on the inside surface 918. The gripping portion 920 provides a portion of the connector 910 that is long enough to be easily gripped by the power tongs 950 and may be gripped and torqued with a reduced chance of thread damage compared with gripping and torqueing the connector 910 on the outside surface 921 coextensive with one of the connection portions 915, 917, which include the threading on the inside surface 918. By mitigating potential damage to threading that could result from torqueing during makeup, the connector 910 with the reinforced portion 930 facilitates threading to a greater torque value than when tonging onto a box end of a standard API tubing connector.

The power tongs 950 tong on to the connector 910 on the gripping portion 920, and any increase in gripping force on the extended connector accompanying an increase in makeup torque may be localized to the gripping portion 920, avoiding application of force to threading located on the connection portions 915, 917 and mitigating the likelihood of thread damage at a given torque value compared with tonging onto the outside diameter of a box end connection portion of a connector 910.

The reinforced portion 930 of the connector 910 proximate the connection portions 915, 917 and the corresponding increase in torque required to engage the threads facilitates making up a connection at a greater torque value. The connector 910 facilitates making up a connection at a greater torque without thread damage, or with a lowered chance of thread damage, than with a standard API connector.

The increase in torque that the connector may be made up at as a result of the gripping surface and the reinforced portion is not dependent on any particular threading pattern and the threaded connector ends may be threaded with a standard API interference fit thread. API interference fit threading on production tubing with an outside diameter of 2.375", 2.875", 3.5", or 4.5" commonly includes API standard 8 round EUE interference fit thread or API standard 10 round non upset ("NU") interference fit thread. Greater outside diameters of production tubing such as 5.5", 7.0", or other sizes may also include interference fit thread. The connectors described herein that include each of the protective portion, the gripping portion, and the reinforced portion, may facilitate making up connections at higher torque values relative to previous connectors using the same API interference fit threading for a given outside diameter of pipe and with a given grade of steel (e.g. J-55, N-80, P-120, etc.).

Increasing the torque value at which a connection is made up requires gripping the connection with greater force to prevent slipping in the tong dies. Increasing the force on a box-end connector, as would be the case in a standard API threaded connector, means increasing the gripping force on the same portion of the connector that is engaging the tubing threading while a connection is made up or broken. As a result, an increase in connection torque, and the corresponding increase in gripping force required to prevent slipping, may result in a corresponding increase in likelihood of thread damage when gripping on a box end of the connector. Any increase in the gripping force on the connector is localized to the gripping portion and does not affect the connection portion. As a result, it may be possible to make up a connection with the connector at a greater torque without thread damage than with a standard API connector. The localization of force of the gripping portion, along with the additional strength and torque per turn ratio provided by the reinforced portion, facilitate making up a connection between two pipes having interference fit threading compatible with the connector at a greater torque value than with previous connectors, while reducing the chances of thread damage.

Connectors for threaded tubing joints can be connected at a given level of torque. For example, previous connectors for 3.5" API interference fit threaded tubing joints made from J-55 grade steel with 8 round EUE interference fit threading can be connected at between about 1,710 and about 2,850 ft·lbs according to API specification, with an optimal connection torque of about 2,280 ft·lbs. An extended and reinforced connector for the same 3.5" API EUE 8 round tubing joints made from J-55 grade steel may be torqued to between about 3,000 ft·lbs and about 3,600 ft·lbs.

Figure 15:
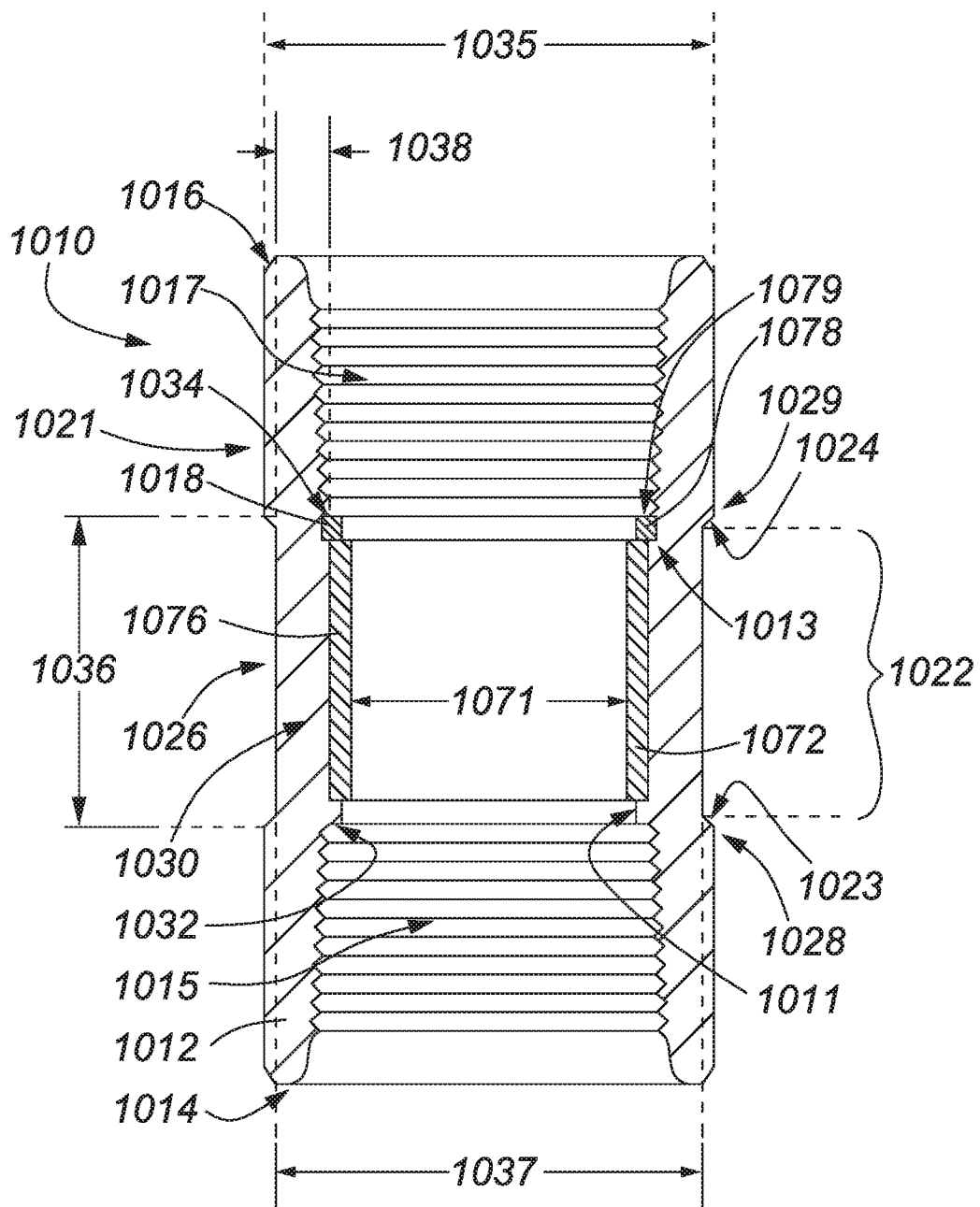
FIG. 15 is a cross-sectional view of a connector having a recessed gripping surface, a reinforced portion, and a protective sleeve secured with a ring.

FIG. 15 shows a connector 1010 including the reinforced portion 1030 and the recessed gripping portion 1022.

Figure 16:
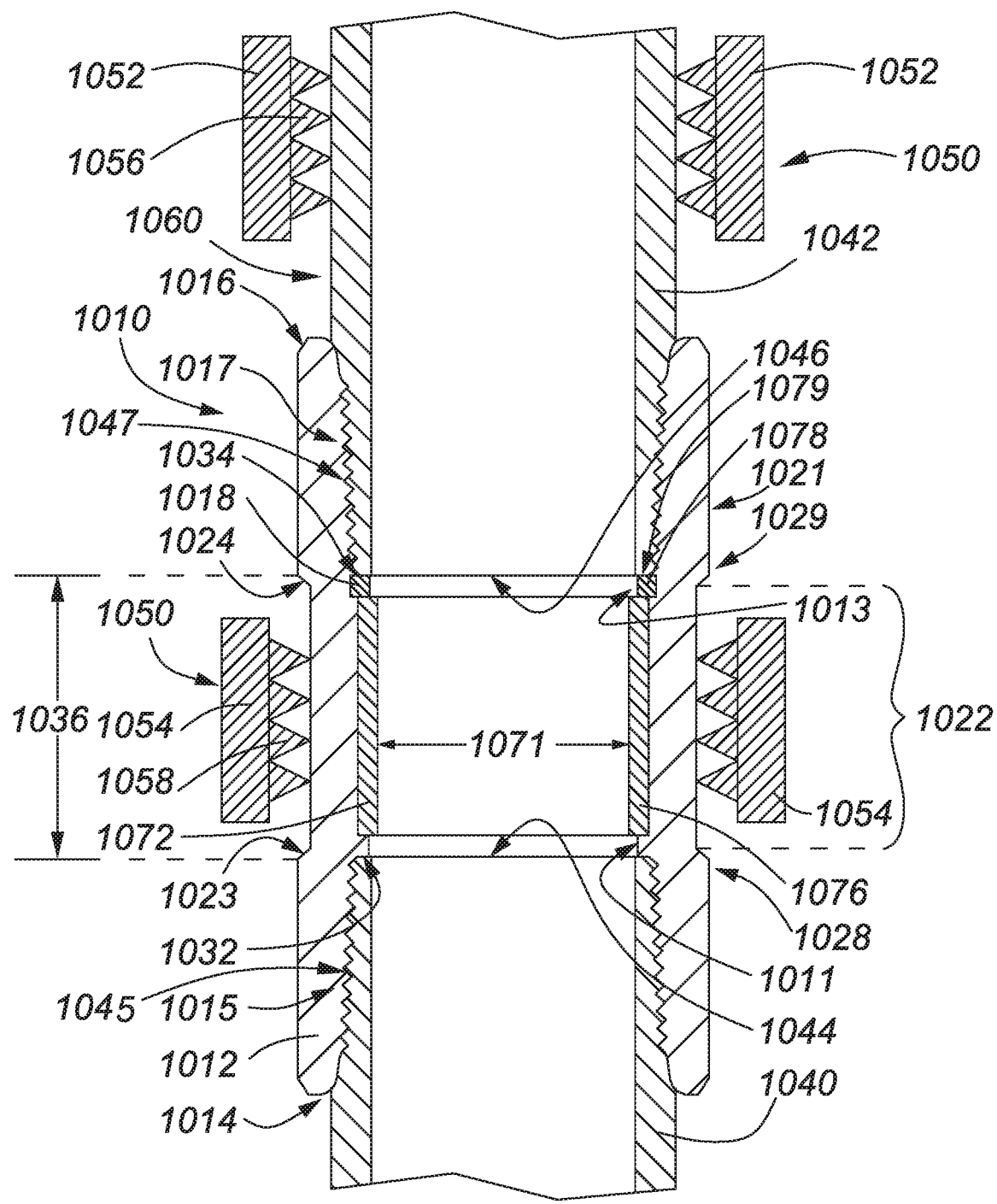
FIG. 16 is a cross-sectional view of the connector of FIG. 15 being connected with a tubing joint and torqued above an API optimum value using power tongs.

FIG. 16 shows the connector 1010 threadedly connecting the first and second production tubing joints 1040, 1042, with the second production tubing joint 1042 and the connector 1010 being engaged by the power tongs 1050.

Figure 17:
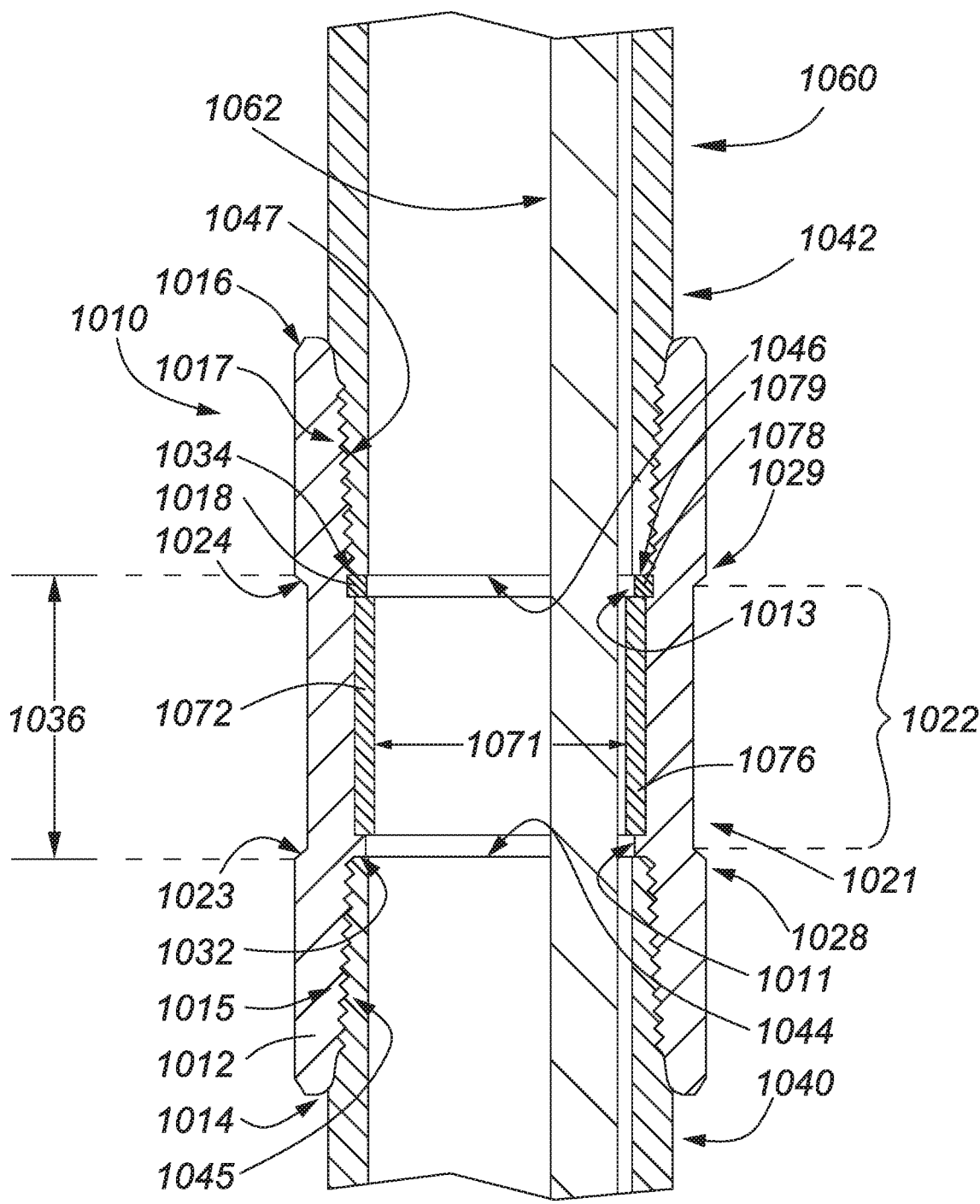
FIG. 17 is a cross-sectional view of a production string including production tubing joints connected with connector of FIG. 15, and a rod string located inside the production string.

FIG. 17 shows the connector 1010 in the production string 1060 with the rod string 1062 run into the production string 1060.

The connector 1010 includes the features described above in relation to the reinforced portion 1030 and the recessed gripping portion 1022. The torque stope 1034 is defined by the outside surface 1079 of the press ring 1078. The torque stop 1032 is located proximate to the stop 1011 and on an opposed side of a projection from the inside surface 1018 that defines both the torque stop 1032 and the stop 1011.

The protective portion inside diameter 1071 is slightly narrower than the tubing inside diameter 1041. For example, the connector 1010 may be designed for used with a 3.5" API EUE production tubing with a weight of 9.30 lb/ft, which has an inside diameter of 2.992" along the tubing connection portions 1045, 1047, and a drift of 2.867". A connector 1010 designed for use with such tubing may have a value of the protective portion inside diameter 1071 of the sleeve 1076 of 2.967", which would provide a 0.025" reduction in the protective portion inside diameter 1071 of the sleeve 1076 relative to the tubing inside diameter 1041, while remaining 0.100" above the drift of the production tubing joints 1040, 1042. In another example, for the same production tubing, the protective portion inside diameter 1071 may be about 2.500", which would provide a thicker sleeve 1076 but reduce the drift of the production string 1060. A thicker sleeve 1076 that extends further from the body 1012 may provide additional protection to the rod string 1062 or may prolong protection where the rod string 1062 degrades the sleeve 1076 over time.

In the connector 1010, as with the connector 810, the locations along the body 1012 of the outside diameter transition points 1023, 1024 between the first outside diameter 1035 and the second outside diameter 1037 each coincide with the locations along the body 1012 of the gripping transition points 1028, 1029. As shown in FIGS. 18 and 19, in other connector designs, the outside diameter transition points may be located at portions of the body other than the gripping transition points, or may be located at portions of the body that limit the gripping surface length to a smaller length than the axial separation between the connection portions.

FIG. 18 is a connector 1110 including the recessed gripping portion 1122. The first outside diameter transition point 1123 is located along the body 1112 intermediate the first gripping transition point 1128 and the first end 1114. The second outside diameter transition point 1124 is located along the body 1112 intermediate the second gripping transition point 1129 and the second end 1116. Put otherwise, the first outside diameter transition point 1123 is located on a portion of the body 1112 including the first connection portion 1115 and the second outside diameter transition point 1124 is located on a portion of the body 1112 including the second connection portion 1117. The recessed gripping portion 1122, which is defined between the first and second gripping transition points 1128, 1129, extends along a portion of the body 1112 free of the threading of the first and second connection portions 1115, 1117 on the inside diameter 1118. As a result, a portion of the body 1112 having the smaller second outside diameter 1137 extends into each of the first and second connection portions 1115, 1117.

The axial depth of the connection portions 1115, 1117 and length of the recessed gripping portion 1122 are selected to allow the connection portions 1115, 1117 to engage threaded pin portions of tubing joints, and for power tongs to grip the tong gripping surface 1126 without gripping the body 1112 coextensive with one of the connection portions 1115, 1117. For a connector to be used with 3.5" API interference fit tubing, a distance between the first outside diameter transition portions 1123 and the first gripping transition point 1128, and between the second outside diameter transition portions 1124 and the second gripping transition point 1129, may be about 0.375".

FIG. 19 is a connector 1210 including the recessed gripping portion 1222. The first outside diameter transition point 1123 is located axially inward along the body 1212 from the first connection portion 1215. Similarly, the second outside diameter transition point 1124 is located axially inward along the body 1212 from the first connection portion 1217. The recessed gripping portion 1222, which is defined between the first and second gripping transition points 1228, 1229, extends along a portion of the body 1212 with a sufficient length to provide the tong gripping surface 1226. As a result, a portion of the body 1212 having the larger first outside diameter 1235 extends beyond each of the first and second connection portions 1215, 1217. Compared with the connector 1110, the connector 1210 would generally be expected to have greater strength and resistance to deformation on threading a pipe into either of the connectors 1110, 1210, as the wall thickness 1238 may be greater in the connector 1210 than the connector 1110, all other factors being equal.

Example Connector for 3.5" API EUE Production Tubing

An extended connector was prepared with a similar body 1112 to the connector 1110 in terms of the profile of the outside surface 1121 of the body 1112, with adaptations on the inside surface 1118 for the protective portion 1170 to include the sleeve, stop, and press ring, similar to the as shown with the connector 1010. The example connector 1110 was designed for connection with 3.5" API EUE interference fit production tubing with an 8 round thread pattern. A previous connector for 3.5" API EUE tubing made from J-55 steel can be connected at between about 1,710 and about 2,850 ft·lbs according to API specification, with an optimal connection torque of about 2,280 ft·lbs. The extended connector, also made from J-55 steel, connected the same 3.5" API EUE tubing joints at torque values of about 3,000 ft·lbs and about 3,600 ft·lbs, in both cases without thread damage.

On the extended connector, with reference to the connector 1110, the distance between the outside diameter transition points 1123, 1124 was 4.0". The recessed gripping portion 1122 had a length of 3.25". The outside diameter of the connector 1110 at the first and second connection portions 1115, 1117 was 4.5". The wall thickness 1138 along the reinforced portion 1130 was 0.625".

TABLE 1

|  | 2,280 ft · lbs | 3,000 ft · lbs | 3,600 ft · lbs |
| --- | --- | --- | --- |
| extended connector on gripping surface | Not Damaged | Not Damaged | Not Damaged |
| extended connector on box end | Not Damaged | Damaged | Damaged |
| API coupling | Not Damaged | Damaged | Damaged |

Table 1 shows a matrix of connectors and torque values tested, with an indication of whether the threads of the connector, the tubing joints, or both were damaged for each set of conditions. As shown in Table 1, tightening a previous connector to torque values of about 3,000 or 3,600 ft·lbs is likely to result in galling of the threads of the previous connector, the tubing joints, or both. In addition, without being bound by any theory, gripping a previous connector with sufficient force to hold it steady while being tightened to about 3,000 or to 3,600 ft·lbs may itself result in crushing and galling of the threads of the connector and the tubing joints when gripping on the box end of a connection being made up or that has been made up. Table 1 also shows that the extended connector is less likely to be damaged by torqueing to 3,000 or 3,600 ft·lbs than the previous connector when the extended connector is gripped on the gripping portion. When gripped on the box end of one of the connection portions, thread damage resulted in the tests. Again, without being bound by any theory, this may result from the increased gripping force required to rotate the connector at a higher torque, and an increased likelihood of damage when gripping on a box end rather than on the gripping portion.

Each of the API collar and the extended collar were also pull tested to 110,000 lbs. when connected at 3,600 ft·lbs and passed the test. However, when disconnected the API collar had damaged threads as shown above in Table 1. API specification would require that the pipe be tested to 142,460 lbs., but this data remains indicative that the connections are sufficient for some applications, including in low-pressure wells with artificial lift.

Figure 20:
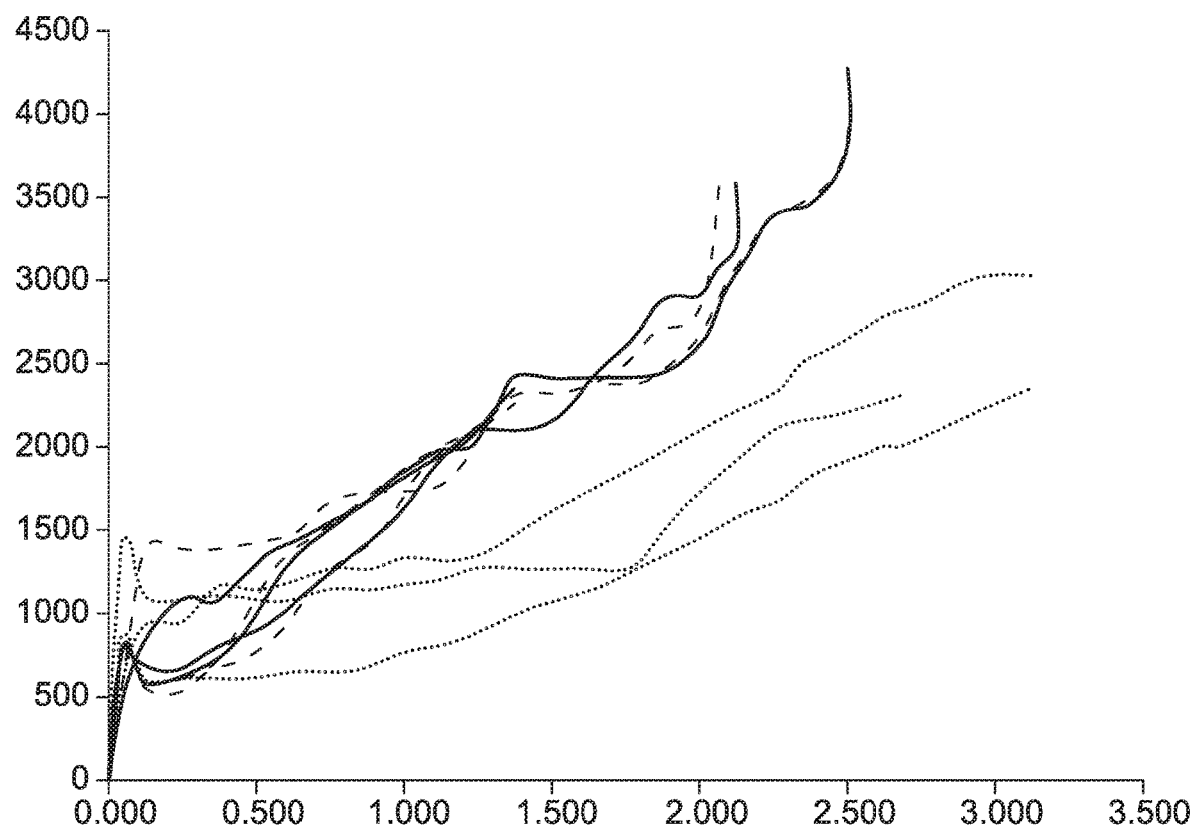
FIG. 20 is a plot of applied torque as a function of the number of turns for previous connectors and pipe connectors with a reinforced portion as described herein torqued to different values.

FIG. 20 shows data of torque vs the number of turns for the data sets shown in Table 1. In FIG. 20, data of the extended connector gripping on the gripping surface is shown in solid lines, data of the extended connector gripping on the box end is shown in dashed lines, and data of the API coupling is shown in dotted lines. This legend is maintained in FIGS. 21 to 23, which show the datasets of FIG. 20 individually. When the extended connector is torqued to 3,000 ft·lbs, or in a second dataset, over 3,600 ft·lbs, the first torque stop 1132 is engaged and rotation stops. At 2,280 ft·lbs, the extended connector has completed less than 1.5 turns. This, and the much steeper slopes of the data with the extended connector, show that more torque is required to thread a pin end into the extended connector than into an API connector. As a result, the connection is much tighter than with the API connector.

Torque vs time data was not collected for the API connector at 3,600 ft·lbs. The two datasets torqued to 2,280 ft·lbs are respectively for a standard OD API connector and a shaved API connector for slimline applications. However, it was confirmed, as in Table 1, that torqueing to 3,600 damaged the API connector.

Figure 21:
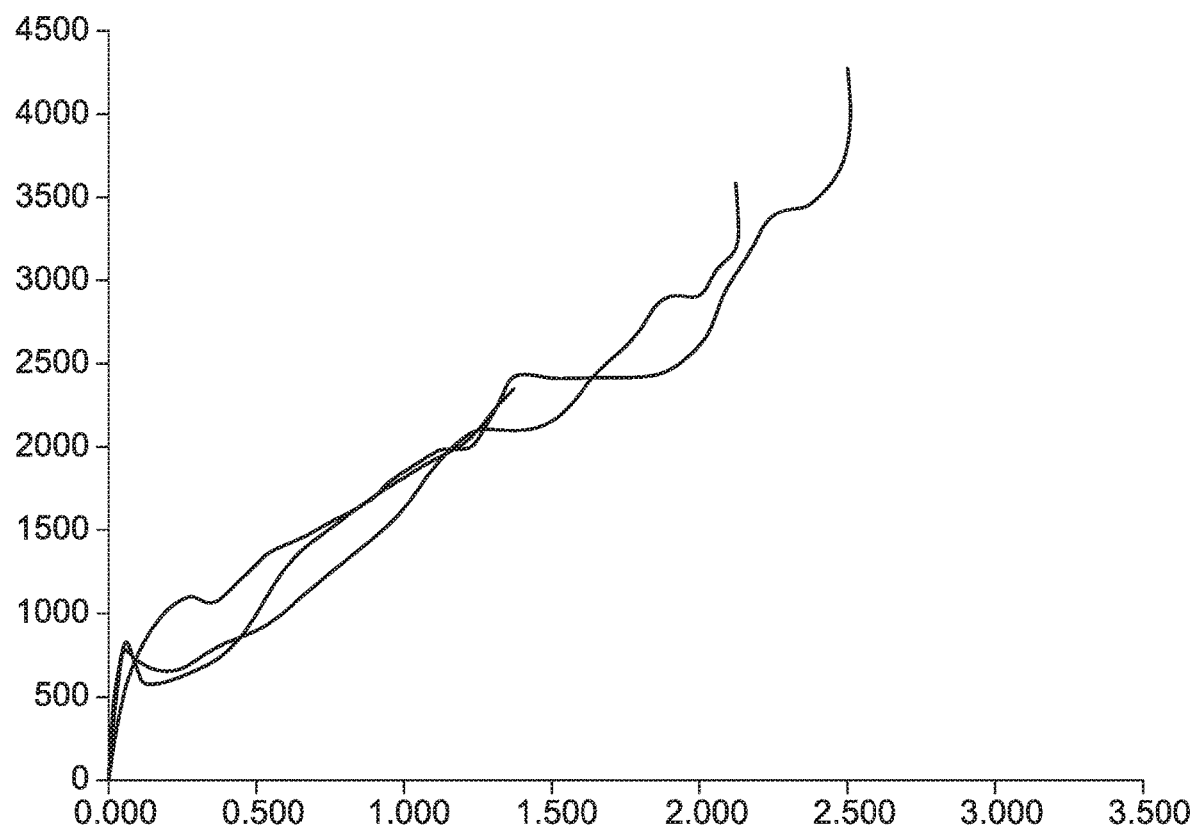
FIG. 21 is a plot of applied torque as a function of the number of turns for a pipe connector with a reinforced portion as described herein gripped at a gripping surface and torqued to different values.
Figure 22:
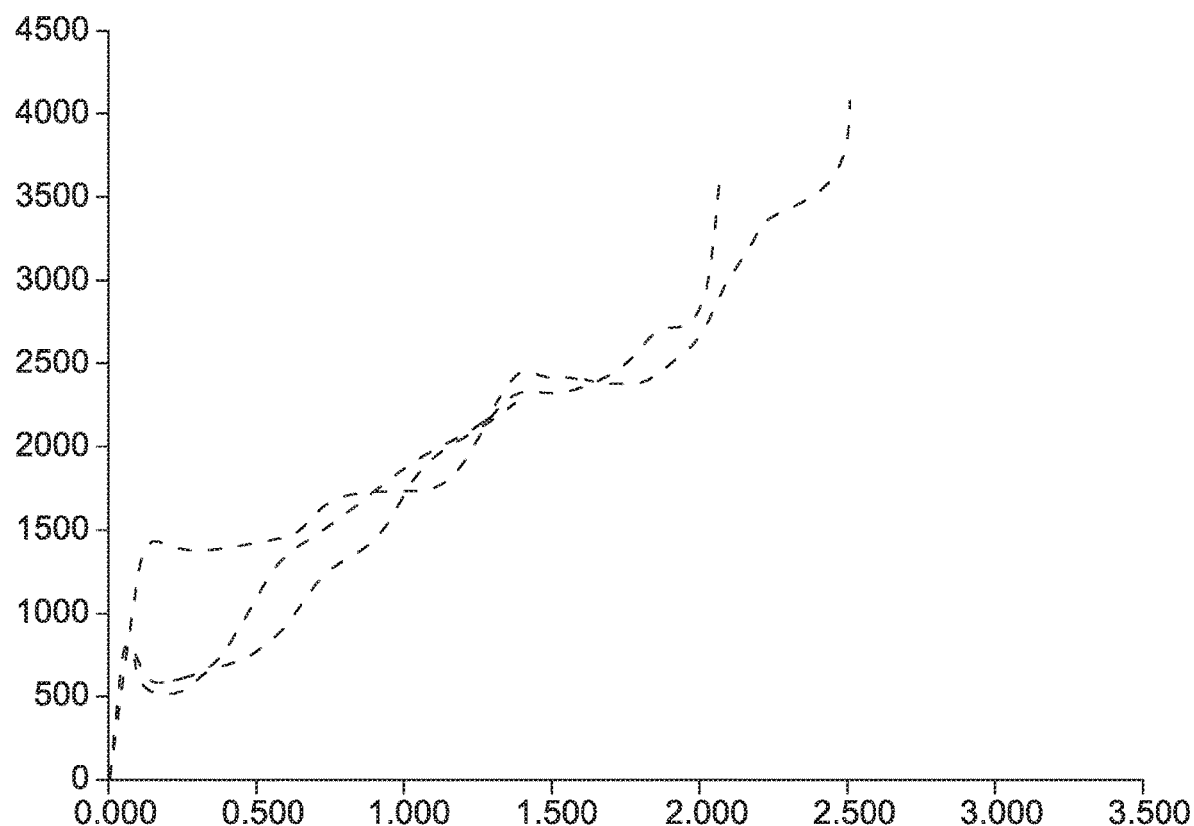
FIG. 22 is a plot of applied torque as a function of the number of turns for a pipe connector with a reinforced portion as described herein gripped at a box end and torqued to different values.
Figure 23:
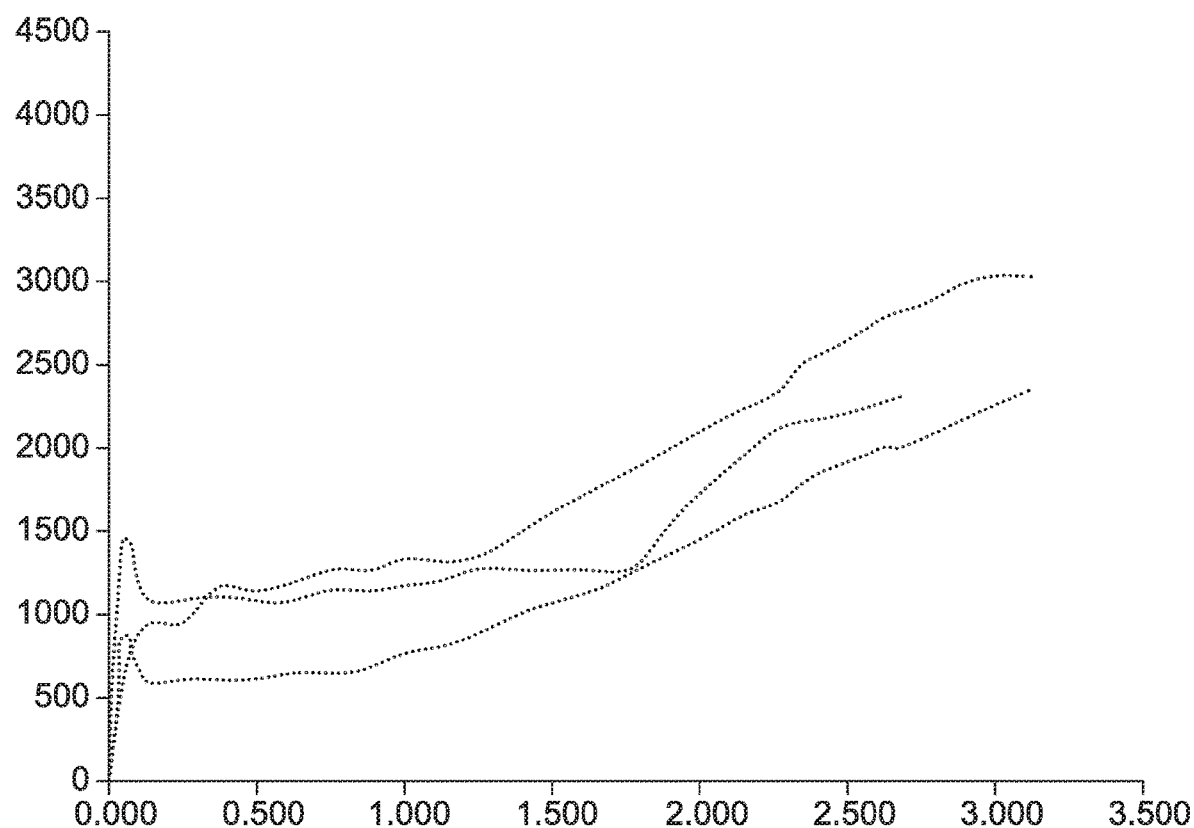
FIG. 23 is a plot of applied torque as a function of the number of turns for a standard API collar gripped at and torqued to different values.

FIGS. 21 to 23 respectively show the data from FIG. 20 of only the extended connector on the gripping surface, the extended connector on the box end, and the regular API connection on the box end. FIG. 20 allows easy comparison of the datasets to review trends in the data. However, FIGS. 21 to 23 allow the individual data sets to be viewed more easily.

Applications with Progressive Cavity Pumps

Pipe connectors, particularly production tubing connectors intended for use with low-pressure wells, are often designed to minimize the amount of material and effort that is needed to prepare the connector and yet remain functional. Such an approach to connectors would often be used in low pressure-wells, where artificial lift, such as a progressive cavity pump (a "PCP") may also be used. Given the large number of production tubing connectors required for a typical oil well run with tubing joints, there is a significant incentive to minimize the material cost of each connector and manufacture connectors with as little material as possible. However, the protective portion included in the connectors described herein may provide cost advantages over previous connectors by mitigating rod wear and reducing the occurrence of rod breakage.

A PCP may be applied in reservoirs that include a significant amount of sand and grit. The presence of a rotating rod string to drive the PCP rotor, in some cases applied in the context of a sandy reservoir, may significantly increase the severity of rod wear and the chances of rod breakage, increasing some of the benefits of applying the connectors with the protective portion described herein In addition, with respect to the tong gripping portion and the reinforced portion, during production through a tubing string including a PCP, a PCP rotor may cause, in addition to rod wear on its own rod string, rotation of the production string by transferring torque. Such rotation of the production string may loosen connection between the connectors and tubing, resulting in dropping the production string into the well. Where a production string is dropped, costly servicing is required. This problem has been previously addressed by use of a torque anchor, which prevents transfer of the PCP rotor torque to the production string. Torque anchors are connected to the production string at or proximate the downhole portion and include anchor blocks or similar features which engage with the inside surface of casing or the well bore when the torque anchor is actuated, preventing rotation of the production string as a result of transfer of PCP rotor torque to the production string. In some cases, torque anchors may puncture or otherwise damage the inside surface of well casing.

With 3,600 ft·lbs of torque applied to connections between production tubing joints, torque transfer from a PCP rotor is far less likely to result in unscrewing of the production string and the need for a torque anchor when using a PCP in the production string is mitigated when using the extended connector and connecting at 3,000 or 3,600 ft·lbs. The greater torque facilitated by the extended gripping portion and the reinforced portion mitigate backing off when using a PCP to produce from a low-pressure oil well.

In contrast, with previous API standard interference fit connectors, connections between the previous connector and the tubing joints are typically made at about 2,280 ft·lbs, and transfer of torque from a PCP rotor to a tubing string connected at this torque may result in unscrewing of connections and dropping of the production string.

The torque expected to be generated by a PCP may be estimated based on the drive rod size and grade. The smaller 1" drive rods are typically used with low flowrate, low lift PCPs and can't handle a lot of torque. These smaller rods likely cannot put out sufficient torque to back off a 3.5" API EUE interference fit thread connections torqued to the optimum specification of 2,280 ft·lbs. Rods with a diameter of 1.25" or 1.5" have torsional strengths in the range where the such couplings could potentially back off and the extended coupling may provide an advantage in mitigating backing off.

Flowrate in a PCP is directly proportional to RPM for any given size of PCP or PDM. Torque is linearly related to pressure drop across the motor. The pressure drop in a PCP is created because of the fluid viscosity, flowrate, lifting height, tubing size, and other variables. These variables are known or can be estimated when designing the completion and sizing the PCP.

If the PCP selected for use is expected to generate higher torque than standard API interference fit pipe connections, a tubing anchor will be used. However, backoff can occur even if expected PCP torque is lower than connection torque because of vibration and the possibility of connection(s) not being properly torqued to spec. As a result, increasing the torque in the connections will reduce the risk of backoff especially when using high flowrate, higher lift PCPs.

In summary, each PCP is selected on the basis of the expected flowrate, required lift, fluid viscosity and other well related parameters. The torque generated during operation will depend on the specifics of the PCP. High flowrate, high lift PCPs can generate very large torque values that are well in excess of the typical pipe connection torque. With low flowrate, low lift PCPs, the torque may not be high at all, even with heavy viscous oil. Candidates where higher torque connections with the extended connector is quantifiably beneficial would be easy to identify based on knowledge of the specifications of the PCP that has been selected for the well. In other cases, the extended connector may be less clearly required but provide additional assurance that backing off will be mitigated. The value of the protective portion of the connectors described herein may be increased with a rod string including a larger size of PCP rotor, as larger PCP rotor may result in greater rod wear on the production string.

Examples Only

In the preceding description, for purposes of explanation, numerous details are set forth in order to provide a thorough understanding of the embodiments. However, it will be apparent to one skilled in the art that these specific details are not required.

The above-described embodiments are intended to be examples only. Alterations, modifications and variations can be effected to the particular embodiments by those of skill in the art without departing from the scope, which is defined solely by the claims appended hereto.

What is claimed is:

1. A connector comprising:
    a body extending between a first end and a second end;
    a first connection portion proximate the first end including threading on an inside surface of the body for connecting with a first pipe;
    a second connection portion proximate the second end including the threading on the inside surface of the body for connecting with a second pipe;
    a protective portion comprising a polymer and extending along at least a portion of an inside surface of the body intermediate the first connection portion and the second connection portion, the protective portion comprising a protective material that is less abrasive than the body to a rod string; and
    a first stop intermediate the protective portion and the first connection portion, and extending radially inwardly relative to the threading, the first stop for contacting an end of the first pipe to prevent further insertion of the first pipe into the body beyond the first connection portion;
    wherein the protective material extends no farther than the first stop in a direction toward the first connection portion;
    a protective portion inside diameter of the body and the protective material along at least a portion of the protective portion is equal to or narrower than an inside diameter at other portions of the body; and
    the protective portion comprises a sleeve of the protective material secured within the body; and
    further comprising a groove defined in the inside surface along the protective portion and wherein the sleeve is secured within the body by seating within the groove.

2. The connector of claim 1 wherein the sleeve comprises a split sleeve.

3. The connector of claim 1 wherein the sleeve is secured against the first stop.

4. The connector of claim 3 wherein the sleeve is secured against the first stop by a press ring intermediate the protective portion and the second connection portion.

5. The connector of claim 1 wherein the protective material comprises polyethylene with a hardness of about 65 Shore D and a dynamic coefficient of friction of about 0.10.

6. The connector of claim 1 wherein the protective material comprises nylon with a hardness of between about 75 and about 85 Shore D, and a dynamic coefficient of friction of about 0.20.

7. The connector of claim 1 further comprising a gripping surface extending along an outside surface of the body intermediate the first connection portion and the second connection portion for a gripping length at least as long as a die length of a pair of power tongs used to connect the connector the first pipe and with the second pipe.

8. The connector of claim 7 wherein:
    the gripping surface comprises a recessed gripping surface;
    the body has a first outside diameter along the first and second connection portions and a second outside diameter along the recessed gripping surface; and
    the first outside diameter is larger than the second outside diameter.

9. The connector of claim 8 wherein:
    a first outside diameter transition point between the first outside diameter and the second outside diameter is located intermediate the first end and the recessed gripping surface; and
    a second outside diameter transition point between the first outside diameter and the second outside diameter is located intermediate the second end and the recessed gripping surface.

10. The connector of claim 9 wherein one of the following:
    the first outside diameter transition point is located on a portion of the outside surface coextensive with the first connection portion on the inside surface;
    the second outside diameter transition point is located on a portion of the outside surface coextensive with the second connection portion on the inside surface; and
    a portion of body with the second outside diameter extends axially outward from the tong gripping portion into each of the first and second connection portions,
    or
    the first outside diameter transition point is located on a portion of the outside surface axially inward along the body from the first connection portion;
    the second outside diameter transition point is located on a portion of the outside surface axially inward along the body from the second connection portion; and
    a portion of body with the first outside diameter extends axially inwards along the body from each of the first and second connection portions.

11. The connector of claim 7 wherein the threading comprises interference fit threading and the connector further comprising a reinforced portion of the body intermediate the first connection portion and the second connection portion for resisting deformation of the body when a connection is made up with the connector.

12. The connector of claim 11 wherein the first stop is located at the reinforced portion, and wherein the reinforced portion further comprises:
    a second stop intermediate the protective portion and the second connection portion, and extending radially inwardly relative to the threading, the second stop for contacting an end of the second pipe to prevent further insertion of the second pipe into the body beyond the second connection portion.

13. The connector of claim 12 wherein the reinforced portion further comprises a reinforcing member extending between the first stop and the second stop.

14. The connector of claim 13 wherein the protective portion extends along the inside surface substantially along the entire length of the reinforcing member.

15. The connector of claim 14 wherein the reinforcing member extends along the body substantially along the entire length of the gripping portion.

16. The connector of claim 13 wherein the inside diameter of the body is substantially constant along the reinforcing member between the first stop and the second stop.

17. The connector of claim 13 wherein the reinforcing member extends along the body substantially along the entire length of the gripping portion.

18. The connector of claim 1 wherein the first pipe and the second pipe each comprise a production tubing joint.

19. The connector of claim 1 wherein the protective portion inside diameter is at least one of: equal to or narrower than an inside diameter of production tubing with which the connector is designed to be used, or substantially equal to an inside diameter of production tubing with which the connector is designed to be used.

20. A method of manufacturing a connector comprising:
providing a connector including a body having an inside surface portion intermediate opposed first and second connection portions, the body comprising a stop extending radially inwardly relative to the inside surface, the stop for contacting an end of a pipe to prevent further insertion of the pipe into the body beyond the first connection portion; and
securing a protective material to the inside surface portion to provide a protective portion along at least a portion of the inside surface portion;
wherein the stop is intermediate the protective portion and the first connection portion;
wherein the protective material extends no farther than the stop in a direction toward the first connection portion;
wherein the protective material is less abrasive than the body to a rod string, and the protective material comprises a polymer;
wherein a protective portion inside diameter of the body and the protective material along at least a portion of the protective portion is equal to or narrower than an inside diameter at other portions of the body; and
wherein the protective portion comprises a sleeve of the protective material secured within the body; and
further comprising a groove defined in the inside surface along the protective portion and wherein the sleeve is secured within the body by seating within the groove.

21. The method of claim 20 wherein securing the protective material to the inside surface portion comprises securing the sleeve against a stop.

22. The method of claim 20 wherein the protective portion inside diameter is equal to or narrower than an in side diameter of production tubing with which the connector is designed to be used.

23. A method of connecting a first pipe with a second pipe comprising:
providing a connector comprising:
a protective portion comprising a polymer and extending along at least a portion of an inside surface of a body of the connector intermediate first and second connection portions having interference fit threading, the protective portion comprising a protective material that is less abrasive than the body to a rod string;
a first stop intermediate the protective portion and the first connection portion, and extending radially inwardly relative to the threading of the first connection portion, the first stop for contacting an end of the first pipe to prevent further insertion of the first pipe into the body beyond the first connection portion; and
a reinforced portion of the body intermediate the first and second connection portions for resisting deformation of the connector when a connection is made up with the connector;
wherein the protective material extends no farther than the first stop in a direction toward the first connection portion;
a protective portion inside diameter of the body and the protective material along at least a portion of the protective portion is equal to or narrower than an inside diameter at other portions of the connector; and
the protective portion comprises a sleeve of the protective material secured within the body; and
further comprising a groove defined in the inside surface along the protective portion and wherein the sleeve is secured within the body by seating within the groove;
tonging on to the body and on to the first pipe with a power tong;
rotating the connector relative to the first pipe to connect the connector to the first pipe at a torque value with the power tong;
tonging on to the body and on to the second pipe with the power tong; and
rotating the second pipe relative to the connector to connect the connector to the second pipe at the torque value with the power tong.

24. The method of claim 23 wherein the connector further comprises a second stop intermediate the protective portion and the second connection portion, and extending radially inwardly relative to the threading of the second connection portion, the second stop for contacting an end of the second pipe to prevent further insertion of the second pipe into the body beyond the second connection portion.

25. The method of claim 23 wherein the end of the first pipe contacting the first stop is indicative of the torque value having been reached.

26. The method of claim 23 wherein the connection portions are threaded with API interference fit threading.

27. The method of claim 26 wherein the torque value is in excess of the API optimum value at the same grade of steel for a connector used with pipe having an outside diameter equal to a reference outside diameter value of the first pipe and the second pipe.

28. The method of claim 27 wherein the torque value is in excess of the API maximum value at the same grade of steel for a connector used with pipe having an outside diameter equal to the reference outside diameter value.

29. The method of claim 23 wherein:
the connector comprises a gripping surface extending along an outside surface of the body intermediate the first connection portion and the second connection portion for a gripping length of about 3.25 inches;
the connector has an outside diameter of about 4.5 inches along the first and second connection portions; and
the first pipe and the second pipe each comprise a 3.5 inches outside diameter API interference fit threaded production tubing joint.

30. The method of claim 29 wherein the body is manufactured from J-55 grade steel.

31. The method of claim 30 wherein the reinforced portion comprises a portion of the body with wall thickness of about 0.625 inches.

32. The method of claim 31 wherein the torque value is in excess of the API maximum value for a connector used with pipe having an outside diameter equal to the reference outside diameter value.

33. The method of claim 32 wherein the torque value is at least 3,000 ft·lbs.

34. The method of claim 33 wherein the torque value is about 3,600 ft·lbs.

35. The method of claim 33 wherein the protective portion inside diameter is narrower than the inside diameter at other portions of the body by at least 0.025 inches.

36. The method of claim 23 wherein the first pipe and the second pipe each comprise a production tubing joint.

37. The method of claim 27 wherein the sleeve is secured against the first stop.

38. The method of claim 37 wherein the sleeve is secured against the first stop by a press ring intermediate the protective portion and the second connection portion.

39. The method of claim 23 wherein the protective material comprises polyethylene with a hardness of about 65 Shore D and a dynamic coefficient of friction of about 0.10.

40. The method of claim 23 wherein the protective material comprises nylon with a hardness of between about 75 and 85 Shore D and a dynamic coefficient of friction of about 0.20.

\* \* \* \* \*